United States Patent
Suzuki et al.

(10) Patent No.: US 8,957,616 B2
(45) Date of Patent: Feb. 17, 2015

(54) CONTROL DEVICE FOR AC MOTOR

(71) Applicant: DENSO CORPORATION, Kariya, Aichi-pref. (JP)

(72) Inventors: Takashi Suzuki, Anjo (JP); Hirofumi Kako, Chita-gun (JP); Takeshi Itoh, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/039,262

(22) Filed: Sep. 27, 2013

(65) Prior Publication Data
US 2014/0091744 A1 Apr. 3, 2014

(30) Foreign Application Priority Data

Sep. 28, 2012 (JP) ................................. 2012-217469

(51) Int. Cl.
| | |
|---|---|
| H02H 7/09 | (2006.01) |
| H02H 7/08 | (2006.01) |
| H02P 21/00 | (2006.01) |
| H02P 6/12 | (2006.01) |
| H02P 21/14 | (2006.01) |

(52) U.S. Cl.
CPC .............. *H02P 6/12* (2013.01); *H02P 21/0035* (2013.01); *H02P 21/14* (2013.01); *H02P 2205/01* (2013.01)
USPC ............. 318/400.22; 318/400.21; 318/400.02

(58) Field of Classification Search
CPC ............... H02P 6/12; H02P 6/14; H02P 6/16; H02P 6/002; H02P 29/02
USPC ........................................ 318/400.21, 400.22
See application file for complete search history.

(56) References Cited

U.S. PATENT DOCUMENTS

| | | | |
|---|---|---|---|
| 6,229,719 B1 | 5/2001 | Sakai et al. | |
| 6,828,744 B2 * | 12/2004 | Na ................................. | 318/432 |
| 7,208,903 B2 * | 4/2007 | Nakai et al. ................... | 318/609 |
| 2003/0227271 A1 * | 12/2003 | Shindo .......................... | 318/439 |
| 2006/0145652 A1 * | 7/2006 | Ta et al. ........................ | 318/807 |
| 2008/0079385 A1 | 4/2008 | Hashimoto et al. | |
| 2008/0252242 A1 * | 10/2008 | Akama et al. ............ | 318/400.14 |
| 2011/0080127 A1 * | 4/2011 | Akama et al. ............ | 318/400.21 |
| 2012/0217923 A1 * | 8/2012 | Wu et al. ....................... | 318/610 |

FOREIGN PATENT DOCUMENTS

| | | |
|---|---|---|
| JP | 2004-159398 | 6/2004 |
| JP | B-4942425 | 3/2012 |

OTHER PUBLICATIONS

Suzuki, et al., U.S. Appl. No. 14/039,248, filed Sep. 27, 2013.
Suzuki, et al., U.S. Appl. No. 14/039,255, filed Sep. 27, 2013.
Suzuki, et al., U.S. Appl. No. 14/039,273, filed Sep. 27, 2013.

* cited by examiner

*Primary Examiner* — Eduardo Colon Santana
*Assistant Examiner* — Gabriel Agared
(74) *Attorney, Agent, or Firm* — Nixon & Vanderhye P.C.

(57) ABSTRACT

A control device for a three-phase alternate current motor includes: a control phase current acquisition means; a monitor phase current acquisition means; a rotation angle acquisition means; a two-phase control current value calculation means; a one-phase current estimated value estimation means; a voltage command value calculation means; an other phase current estimation means for calculating a monitor or a control phase current estimated value; an abnormality detection means for detecting an abnormality in a monitor phase or a control phase current sensor; a number-of-revolutions calculation means for the motor; a number-of-revolutions determination means for determining whether the number of revolutions is not larger than a predetermined determination value; and a switching means between a two-phase control mode when the number of revolutions is not larger than the determination value and a one-phase control mode when the number of revolutions is larger than the determination value.

9 Claims, 17 Drawing Sheets

CONTROL DEVICE FOR AC MOTOR

CROSS REFERENCE TO RELATED APPLICATION

This application is based on Japanese Patent Application No. 2012-217469 filed on Sep. 28, 2012, the disclosure of which is incorporated herein by reference.

TECHNICAL FIELD

The present disclosure relates to a control device for an AC motor.

BACKGROUND

In recent years, from the social requirement of lower fuel consumption and less exhaust emission, an electric automobile and a hybrid automobile, each of which is mounted with an AC (alternate current) motor as a power source of a vehicle, is drawing attention. For example, in some of the hybrid automobiles, a DC (direct current) power source made of a secondary battery or the like and an AC motor are connected to each other via an electric power conversion device constructed of an inverter and the like, and the DC voltage of the DC power source is converted into AC voltage by the inverter to thereby drive the AC motor.

In the control device of the AC motor mounted in the hybrid automobile and the electric automobile like this, there is known a technology in which by disposing a current sensor for sensing a phase current only in one phase, the number of current sensors is decreased and a part near three-phase output terminals of an inverter is reduced in dimension and the cost of a control system of the AC motor is reduced (see, for example, patent document 1). Further, as a technology for controlling an electric motor on the basis of a current sensed value of only one phase, for example, as shown by patent document 2, there is also proposed a technology in which in order to prevent a torque ripple by a three phase unbalance caused by a gain error between current detectors, an ideal AC waveform based on a current value of one phase is acquired and the electric motor is controlled by the ideal AC waveform.

In the patent document 2, from the fact that an ideal AC waveform has its respective phases shifted by 120° from each other, the current values of the other phases are estimated by simply delaying the current value of one phase by 120° so as to match the ideal AC waveform. By the method like this, essentially, two-dimensional quantities (for example, a d-axis current and a q-axis current) necessary for a vector control cannot be correctly controlled.

Further, in the patent document 1, the other phase current is estimated by multiplying a sensed value of the current sensor of one phase by a coefficient, but not only in a locked state but also in the state where the sensed value becomes 0, the current values of all phases become 0. Further, since the three-phase alternating currents are assumed to be ideal sine waves and a phase and a coefficient are derived from the ideal sine waves, it is impossible to acquire estimated values reflecting actual currents.

For example, in order to perform a vector control with high accuracy in a system in which a main motor needs to be performed at high speed and with high accuracy, as is the case of the main motor of the hybrid vehicle and the electric automobile, it is necessary to make a correction for adding a remaining one-dimensional component to the current sensed value of one phase. To that end, it is considered to estimate two-dimensional quantities with high accuracy by the use of information changed in synchronization with the rotation of an AC motor. At this time, when the number of revolutions of the AC motor is small, a change in the information changed in synchronization with the rotation of the AC motor is small and hence the accuracy of current estimation is likely to be impaired.

When the accuracy of current estimation is impaired, an abnormal current is likely to be passed through the AC motor to thereby generate an abnormal torque. When the abnormal torque is generated, for example, in the case where the AC motor is mounted in the hybrid vehicle and the electric automobile, drivability will be impaired. Here, the abnormal current is assumed to include a too small current and a too large current. Further, the abnormal torque is assumed to include a too small torque by a too small current and a too large torque by a too large current.

For example, in the case where the AC motor is applied to the main motor of the hybrid vehicle or the electric automobile, the following problem can be caused: that is, when a too small current is passed through the AC motor, a desired torque is not generated; and hence, a user is likely to depress an accelerator pedal more than necessary to suddenly generate toque, or when the accuracy of current estimation is improved, torque is likely to be suddenly generated, which hence can cause a sudden start.

Further, when a too large current is passed through the AC motor, a various kinds of elements used for the control device of the AC motor are likely to generate heat or to cause a failure.

[Patent document 1] Japanese Unexamined Patent Publication No. 2004-159398

[Patent document 2] Japanese Patent No. 4942425

SUMMARY

It is an object of the present disclosure to provide a control device for an AC motor that can sense an abnormality of a current sensor and that can improve the accuracy of control of the AC motor.

According to a first aspect of the present disclosure, a control device for controlling and driving a three-phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value and the rotation angle sensed value in such a manner that the one-phase current estimated value for controlling the alternate current motor is calculated by integrating a correction vector on a d-q axis plane, the correction vector being calculated based on a control phase current basic value and the control phase current sensed value, and the control phase current basic value being a component of the control phase of a previously calculated one-phase current estimated value; a voltage command value calculation means for calculating a voltage command value relating to a voltage to be impressed on the inverter based on the two-phase control current value, which is to be fed back, or the one-phase current estimated value for controlling the alternate current motor, which is to be fed back; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality; a number-of-revolutions calculation means for calculating the number of revolutions of the alternate current motor based on the rotation angle sensed value; and a number-of-revolutions determination means for determining whether the number of revolutions is not larger than a predetermined determination value. When the number of revolutions is not larger than the determination value, the switching means selects the two-phase control mode. When the number of revolutions is larger than the determination value, the switching means selects the one-phase control mode.

In the above control device, in the one-phase control mode, the monitor phase current sensed value is not used for the current feedback control but the current feedback control is performed by the use of the one-phase current estimated value for controlling, which hence makes it possible to prevent the current feedback control from interfering with the monitor phase current sensed value and to detect an abnormality of the current sensor. Further, an abnormality of the current sensor is detected on the basis of the comparison result of the current estimated value and the current sensed value. Here, one of the current sensed value and current estimated value which are compared with each other is the monitor phase current sensed value itself, which is not used for the current feedback control, or a current estimated value, which is based on the monitor phase current sensed value, and hence is not affected by the interference of the current feedback control, which hence makes it possible to suitably detect an abnormality of the current sensor.

In this way, the correction vector is used as information changing with the rotation of the AC motor. In this way, the one-phase current estimated value for controlling is calculated by the use of the information changing with the rotation of the AC motor, so that it is possible to estimate two-dimensional quantities with high accuracy by adding a remaining one-dimensional component to the control phase current sensed value and hence to perform a two-dimensional vector control with high accuracy.

Here, when the number of revolutions of the AC motor is small, a change in the correction vector of the information changing with the rotation of the AC motor or a change in the deviation between the current command value and the one-phase control current estimated value is small, so that the controllability of the AC motor is likely to be impaired.

Hence, at the time of low rotation in which the estimation accuracy of the one-phase current estimated value for controlling is likely to become worse, the two-phase control current values of actual current values are calculated not by the use of the one-phase current estimated value for controlling but by the use of control phase current sensed value and the monitor phase current sensed value, and the AC motor is controlled on the basis of the voltage command values calculated on the basis of the two-phase control current values. In this way, it is possible to prevent the controllability of the AC motor from being impaired at the time of low rotation and to inhibit an abnormal torque from being generated by an abnormal current being passed through the AC motor and to inhibit various kinds of elements constructing the control device from generating heat and causing a failure. Further, in the case where the AC motor is used for the main motor of the hybrid vehicle or the electric automobile, it is possible to prevent drivability from being impaired by the generation of an abnormal torque and to prevent a sudden start from being caused by a user depressing an accelerator pedal more than required when a desired torque is not generated because of too small current passed through the AC motor and by torque being generated suddenly when the accuracy of current estimation is improved.

According to a second aspect of the present disclosure, a control device for controlling and driving a three phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value, the rotation angle sensed value and a current command value relating to a driving of the alternate current motor; a voltage command value calculation means for calculating a voltage command value relating to a voltage to be impressed on the inverter based on the two-phase control current value, which is to be fed back, or the one-phase current estimated value for controlling the alternate current motor, which is to be fed back; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on he monitor phase current sensed value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality; a number-of-revolutions calculation means for calculating the number of revolutions of the alternate current motor based on the rotation angle sensed value; and a number-of-revolutions determination means for determining whether the number of revolutions is not larger than a predetermined determination value. When the number of revolutions is not larger than the determination value, the switching means selects the two-phase control mode. When the number of revolutions is larger than the determination value, the switching means selects the one-phase control mode.

In the above control device, in the one-phase control mode, the monitor phase current sensed value is not used for the current feedback control but the current feedback control is performed by the use of the one-phase current estimated value for controlling, which hence makes it possible to prevent the current feedback control from interfering with the monitor phase current sensed value and to detect an abnormality of the current sensor. Further, an abnormality of the current sensor is detected on the basis of the comparison result of the current estimated value and the current sensed value. Here, one of the current sensed value and current estimated value which are compared with each other is the monitor phase current sensed value itself, which is not used for the current feedback control, or a current estimated value, which is based on the monitor phase current sensed value, and hence is not affected by the interference of the current feedback control, which hence makes it possible to suitably detect an abnormality of the current sensor.

In this way, for example, the deviation between the current command value and the one-phase current estimated value for controlling can be used as information changing with the rotation of the AC motor. In this way, the one-phase current estimated value for controlling is calculated by the use of the information changing with the rotation of the AC motor, so that it is possible to estimate two-dimensional quantities with high accuracy by adding a remaining one-dimensional component to the control phase current sensed value and hence to perform a two-dimensional vector control with high accuracy.

Here, when the number of revolutions of the AC motor is small, a change in the correction vector of the information changing with the rotation of the AC motor or a change in the deviation between the current command value and the one-phase control current estimated value is small, so that the controllability of the AC motor is likely to be impaired.

Hence, at the time of low rotation in which the estimation accuracy of the one-phase current estimated value for controlling is likely to become worse, the two-phase control current values of actual current values are calculated not by the use of the one-phase current estimated value for controlling but by the use of control phase current sensed value and the monitor phase current sensed value, and the AC motor is controlled on the basis of the voltage command values calculated on the basis of the two-phase control current values. In this way, it is possible to prevent the controllability of the AC motor from being impaired at the time of low rotation and to inhibit an abnormal torque from being generated by an abnormal current being passed through the AC motor and to inhibit various kinds of elements constructing the control device from generating heat and causing a failure. Further, in the case where the AC motor is used for the main motor of the hybrid vehicle or the electric automobile, it is possible to prevent drivability from being impaired by the generation of an abnormal torque and to prevent a sudden start from being caused by a user depressing an accelerator pedal more than required when a desired torque is not generated because of too small current passed through the AC motor and by torque being generated suddenly when the accuracy of current estimation is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a control device of an AC motor control for controlling the drive of an AC motor according to the present disclosure will be described with reference to the drawings. Hereinafter, in a plurality of embodiments, the substantially same constructions are denoted by the same reference symbols and their descriptions will be omitted.

(First Embodiment)

Figure 1:
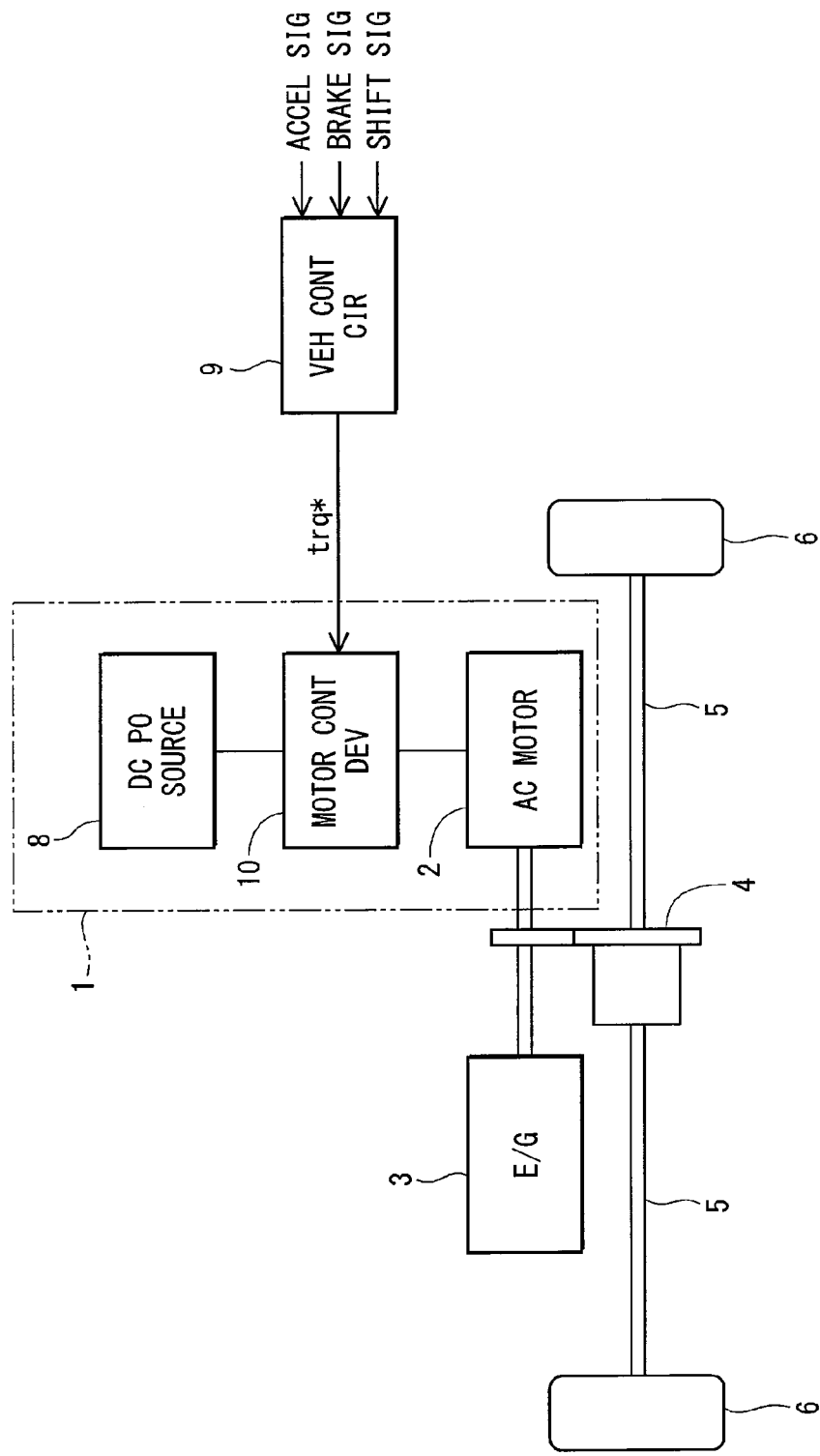
FIG. 1 is a schematic view to show a construction of an electric motor drive system of a first embodiment of the present disclosure.

As shown in FIG. 1, an electric motor control device 10 as a control device of an AC motor 2 according to a first embodiment of the present disclosure is applied to an electric motor drive system 1 for driving an electric vehicle.

The electric motor drive system 1 includes the AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three-phase permanent-magnet type synchronous motor.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator having a function as an electric motor that generates torque for driving the driving wheels 6 and a function as a generator that is driven by the engine 3 and that can generate electricity.

The AC motor 2 is coupled to an axle 5 via a gear 4. In this way, the torque generated by the drive of the AC motor 2 rotates the axle 5 via the gear 4 to thereby drive the driving wheels 6.

The DC power source 8 is an electric storage device that can charge and discharge, for example, a secondary battery such as a nickel metal hydride battery or a lithium ion battery, and an electric double-layer capacitor. The DC power source 8 is connected to an inverter 11 (see FIG. 2) of the electric motor control device 10, that is, the DC power source 8 is so constructed as to supply electricity to the AC motor 2 and to be supplied with electricity from the AC motor 2 via the inverter 11.

A vehicle control circuit 9 is constructed of a microcomputer and the like and is provided with a CPU, a ROM, an I/O and a bass line for connecting these constructions, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not in the drawings. Further, the vehicle control circuit 9 detects a driving state of the vehicle on the basis of the acquired signals and outputs a torque command value trq* responsive to the driving state to the electric motor control device 10. Still further, the vehicle control circuit 9 outputs a command signal to an engine control circuit (not shown) for controlling the drive of the engine 3.

Figure 2:
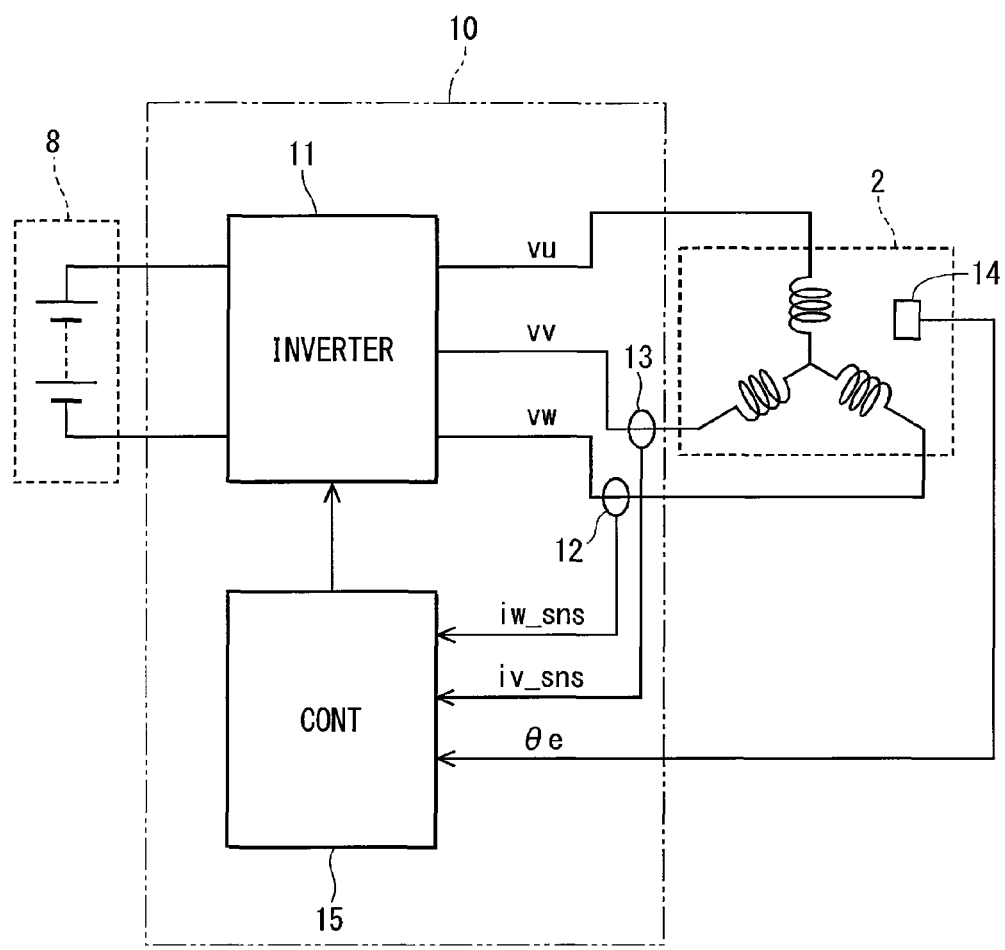
FIG. 2 is a schematic view to show a construction of an electric motor control device of the first embodiment of the present disclosure.

As shown in FIG. 2, the electric motor control device 10 is provided with the inverter 11 and a control section 15.

The inverter 11 has a system voltage VH impressed thereon according to the driving state of the AC motor 2, a vehicle request, and the like, the system voltage VH being a voltage to which the DC voltage of the DC power source 8 is boosted up by a boost converter (not shown). Further, the inverter 11 has six switching elements (not shown) connected in bridge mode. As to the switching element, for example, an IGBT (Insulated Gate Bipolar Transistor), a MOS (Metal Oxide Semiconductor) transistor, and a bipolar transistor can be used for the switching elements. The switching element is switched on/off on the basis of voltage command values vu*, w*, and vw* outputted from an inverse dq transformation part 23 of the control section 15. In this way, the inverter 11 controls three-phase AC voltages vu, w, vw to be impressed on the AC motor 2. The AC motor 2 has its drive controlled by the three-phase AC voltages vu, w, vw impressed thereon, the three phase AC voltages vu, w, vw being generated by the inverter 11.

Here, the drive control of the AC motor 2 will be described. According to the number of revolutions N of the AC motor 2, which is based on an electric angle θe sensed by a rotation angle sensor 14, and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and to whether the command value trq* is positive or negative, the electric motor control device 10 switches the operation of the AC motor 2 into the following four patterns:

<1. Normal rotation powering operation> when the number of revolutions N is positive and the torque command trq* is positive, the AC motor 2 consumes electricity;

<2. Normal rotation regenerating operation> when the number of revolutions N is positive and the torque command trq* is negative, the AC motor 2 generates electricity;

<3. Reverse rotation powering operation> when the number of revolutions N is negative and the torque command trq* is negative, the AC motor 2 consumes electricity; and <4. Reverse rotation regenerating operation> when the number of revolutions N is negative and the torque command trq* is positive, the AC motor 2 generates electricity.

In the case where the number of revolutions N>0 (normal rotation) and the torque command trq*>0, or the number of revolutions N<0 (reverse rotation) and the torque command trq*<0, the inverter 11 converts the DC electricity supplied from the DC power source 8 to AC electricity by the switching operation of the switching element to thereby drive the AC motor 2 in such a way as to output torque (perform a powering operation).

On the other hand, in the case where the number of revolutions N>0 (normal rotation) and the torque command trq*<0, or the number of revolutions N<0 (reverse rotation) and the torque command trq*>0, the inverter 11 converts the AC electricity generated by the AC motor 2 to DC electricity by the switching operation of the switching elements to thereby supply the DC electricity to the DC power source 8, whereby the AC motor 2 performs a regenerating operation.

A control phase current sensor 12 is disposed on any one phase of the AC motor 2. In the present embodiment, the control phase current sensor 12 is disposed on W phase. That is, in the present embodiment, the W phase corresponds to "a control phase". The control phase current sensor 12 senses a control phase current sensed value iw_sns, which is to be passed to the W phase of the control phase, and outputs the control phase current sensed value iw_sns to the control section 15.

A monitor phase current sensor 13 is disposed on one phase different from the control phase of the AC motor 2. In the present embodiment, the monitor phase current sensor 13 is disposed on V phase. That is, in the present embodiment, the V phase corresponds to "a monitor phase". The monitor phase current sensor 13 senses a monitor phase current sensed value iv_sns, which is to be passed to the V phase of the monitor phase, and outputs the monitor phase current sensed value iv_sns to the control section 15.

In the present embodiment, each of the control phase current sensor 12 and the monitor phase current sensor 13 senses voltage to be impressed on the corresponding phase and senses current on the basis of the sensed voltage. However, any construction can be employed in which the control phase current sensed value iw_sns and the monitor phase current sensed value iv_sns can be acquired by the control section 15. Further, in the present embodiment, the control phase is made the W phase and the monitor phase is made the V phase. However, if the control phase and the monitor phase are different from each other, any phase may be made the control phase or the monitor phase.

The rotation angle sensor 14 is disposed near a rotor (not shown) of the AC motor 2 and senses an electric angle θe and outputs the sensed electric angle θe to the control section 15. Further, the number of revolutions N of the rotor of the AC motor 2 (hereinafter, as required, simply referred to as "the number of revolutions N of the AC motor 2") is calculated on the basis of the electric angle θe sensed by the rotation angle sensor 14. The rotation angle sensor 14 of the present embodiment is a resolver. In addition, the rotation angle sensor 14 may be an other kind of sensor such as a rotary encoder.

The control section 15 is constructed of a microcomputer and the like and is provided with a CPU, a ROM, an I/O and a bus line for connecting these constructions, all of which are not shown in the drawings. The control section 15 controls the operation of the AC motor 2 by software processing, which is performed by executing previously stored programs by the CPU, and by hardware processing, which is performed by a dedicated electronic circuit.

Figure 3:
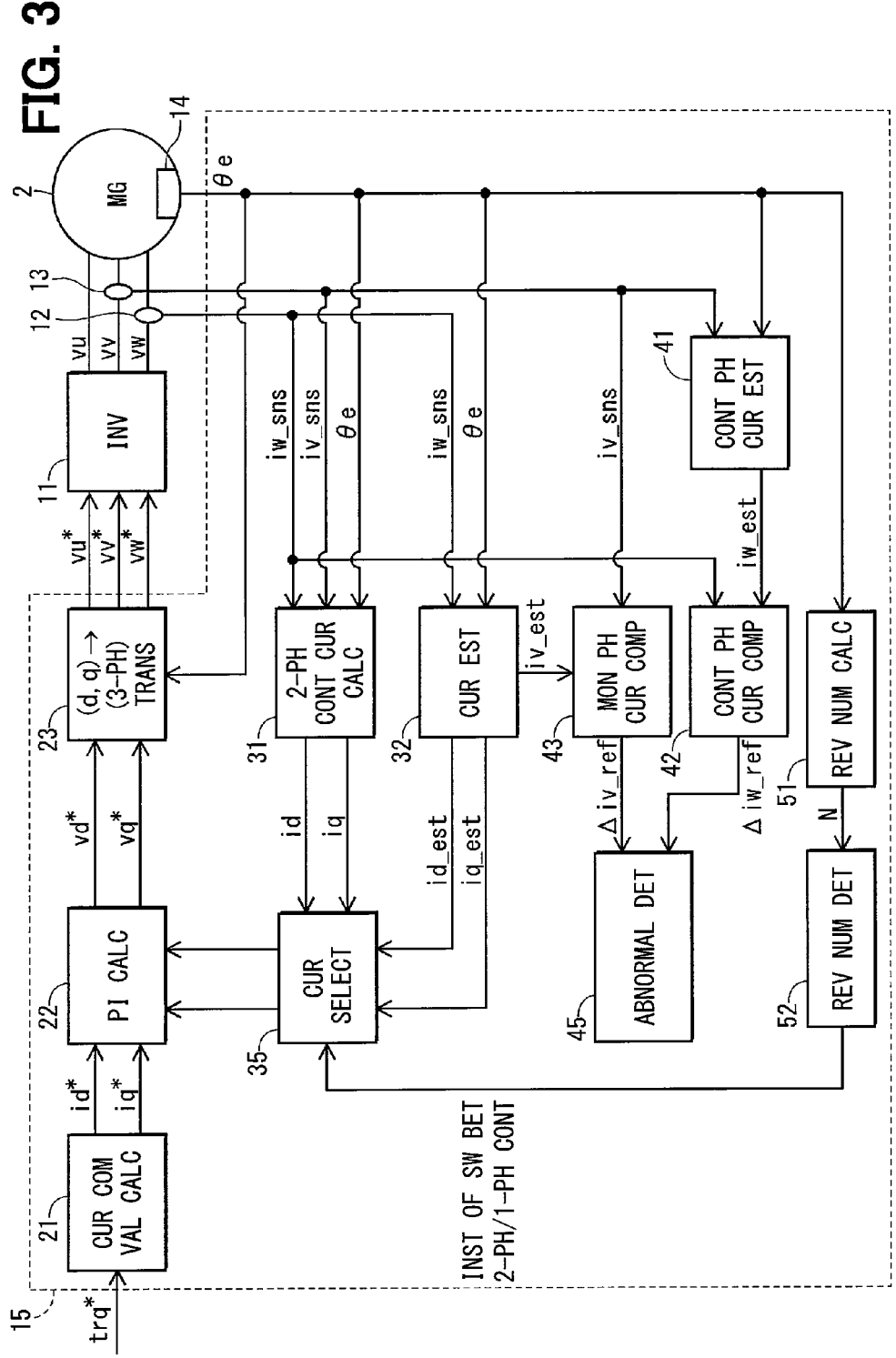
FIG. 3 is a block diagram to show the construction of the electric motor control device of the first embodiment of the present disclosure.

As shown in FIG. 3, the control section 15 includes a current command value calculation part 21, a PI calculation part 22, an inverse dq transformation part 23, a two-phase control current calculation part 31, a current estimation part 32, a current selection part 35, a control phase current estimation part 41, a control phase current comparison part 42, a monitor phase current comparison part 43, an abnormality determination part 45, a number-of-revolutions calculation part 51, and a number-of-revolutions determination part 52.

The current command value calculation part 21 calculates a d-axis current command value id* and a q-axis current command value iq* in a rotating coordinate system ((d,q) coordinate system) set as the rotating coordinates of the AC motor 2 on the basis of the torque command value trq* acquired from the vehicle control circuit 9. In the present embodiment, the d-axis current command value id* and the q-axis current command value iq* are calculated with reference to a previously stored map but may be calculated by a mathematical equation or the like.

The PI calculation part 22 calculates a d-axis voltage command value vd* and a q-axis voltage command value vq*. In more detail, in order to make a d-axis current value id or a d-axis current estimated value id_est, which is fed back from the current selection part 35, follow the d-axis current command value id*, the PI calculation part 22 calculates the d-axis voltage command value vd* by PI calculation in such a way as to make the difference between the d-axis current command value id* and the d-axis current value id or the d-axis current estimated value id_est converge to 0. Similarly, in order to make a q-axis current value iq or a q-axis current estimated value iq_est, which is fed back from the current selection part 35, follow a q-axis current command value iq*, the PI calculation part 22 calculates the q-axis voltage command value vq* by PI calculation in such a way as to make the difference between the q-axis current command value iq* and the q-axis current value iq or the q-axis current estimated value iq_est converge to 0.

The inverse dq transformation part 23 inversely dq transforms the d-axis voltage command value vd* and the q-axis voltage command value vq* to a U-phase voltage command value vu*, a V-phase voltage command value vv*, and a W-phase voltage command value vw* on the basis of the electric angle θe acquired from the rotation angle sensor 14.

The switching elements of the inverter 11 are switched on/off on the basis of the U-phase voltage command value vu*, the V-phase voltage command value vv*, and the W-phase voltage command value vw*. In this way, three-phase AC voltages vu, w, vw are generated by the inverter 11, and the three-phase AC voltages vu, w, vw are impressed on the AC motor 2. In this way, the drive of the AC motor 2 is controlled in such a way as to output a torque responsive to the torque command value trq*. In the present embodiment, the three-phase AC voltages vu, w, vw correspond to "impressed voltages".

The two-phase control current calculation part 31 calculates the d-axis current value id and the q-axis current value iq by the dq transformation on the basis of the control phase current sensed value iw_sns, the monitor phase current sensed value iv_sns, and the electric angle θe. The two-phase control current calculation part 31 calculates the d-axis current value id and the q-axis current value iq on the basis of the control phase current sensed value iw_sns and the monitor phase current sensed value iv_sns, which are the current sensed values of two phases. Hence, the d-axis current value id and the q-axis current value iq, which are calculated here, are actual current values.

Here, a general equation of the dq transformation will be shown by a mathematical equation (1).

[Mathematical formula 1]

$$\begin{bmatrix} id \\ iq \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (1)$$

Further, when an equation (3) calculated by the Kirchhoff's law (see an equation (2)) is substituted into the equation (1), an equation (4) can be acquired.

$$iu+iv+iw=0 \quad (2)$$

$$iu=-iv-iw \quad (3)$$

[Mathematical formula 2]

$$\begin{bmatrix} id \\ iq \end{bmatrix} = \sqrt{\frac{2}{3}} \begin{bmatrix} \cos(\theta e - 120°) - \cos(\theta e) & \cos(\theta e + 120°) - \cos(\theta e) \\ -\sin(\theta e - 120°) + \sin(\theta e) & -\sin(\theta e + 120°) + \sin(\theta e) \end{bmatrix} \quad (4)$$
$$\begin{bmatrix} iv\_sns \\ iw\_sns \end{bmatrix}$$
$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} iv\_sns \\ iw\_sns \end{bmatrix}$$
$$= \sqrt{2} \begin{bmatrix} -\sin(\theta e + 120°) & -\sin(\theta e + 60°) \\ -\cos(\theta e + 120°) & -\cos(\theta e + 60°) \end{bmatrix} \begin{bmatrix} iv\_sns \\ iw\_sns \end{bmatrix}$$

As shown by the equation (4), if the current values of two phases among three phases, the d-axis current value id and the q-axis current value iq can be calculated, so that the current value of the other phase (U phase in the present embodiment) does not need to be calculated.

The current estimation part 32 calculates a d-axis current estimated value id_est and a q-axis current estimated value iq_est and a monitor phase current estimated value iv_est on the basis of the control phase current sensed value iw_sns and the electric angle θe.

Figure 5:
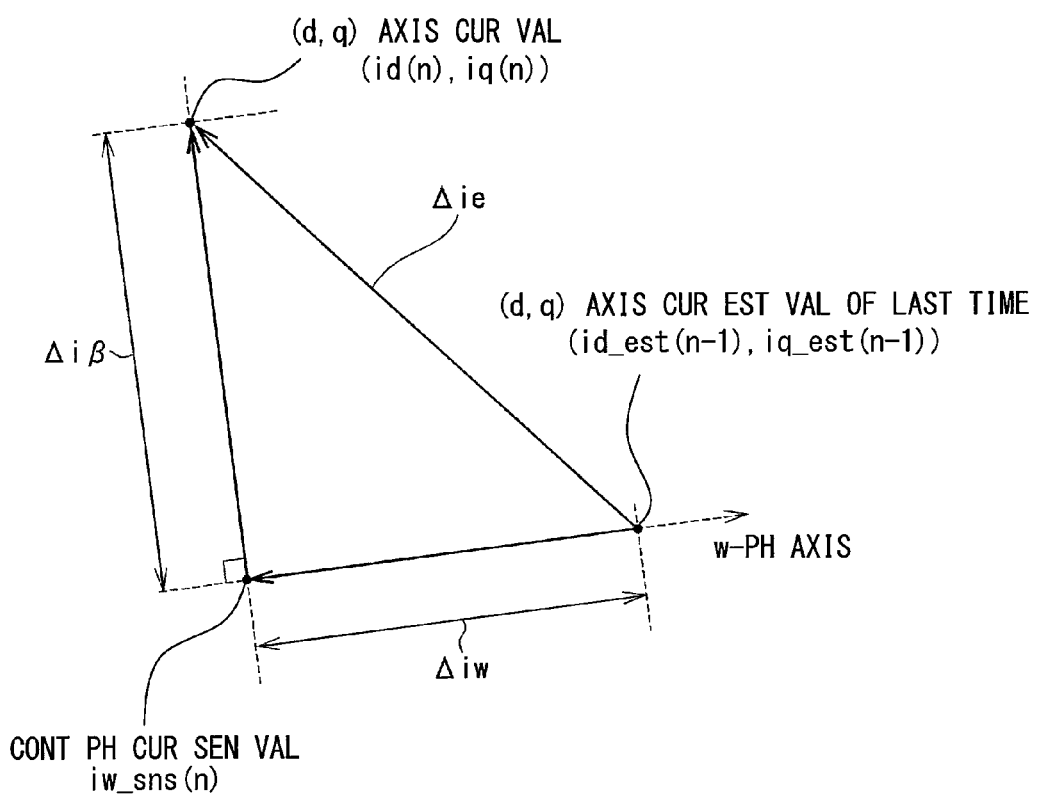
FIG. 5 is an illustration to illustrate a current estimation according to the first embodiment of the present disclosure.

That is, the current estimation part 32 estimates the d-axis current estimated value id_est and the q-axis current estimated value iq_est by the use of the control phase current sensed value iw_sns of one phase. As shown in FIG. 5, the d-axis current value id and the q-axis current value iq can be directly calculated by the use of the control phase current sensed value iw_sns and the monitor phase current sensed value iv_sns, which are the current sensed values of two phases. However, in the case where the d-axis current estimated value id_est and the q-axis current estimated value iq_est are calculated by the use of the control phase current sensed value iw_sns of one phase, a control phase estimated error Δiw, which is a W-phase component of an error vector Δie, can be calculated, but a β-axis estimated error Δiβ, which is a component perpendicular to the W phase, cannot be calculated.

Then, in the present embodiment, the current estimation part 32 integrates the control phase estimated error Δiw by the use of the W-phase axis relatively rotating on a (d,q) axis plane, which is a rotating coordinate system, to thereby make the d-axis current estimated value id_est and the q-axis current estimated value iq_est asymptotic to the d-axis current value id and the q-axis current value iq, respectively. In this way, the current estimation part 32 calculates the d-axis current estimated value id_est and the q-axis current estimated value iq_est with high accuracy on the basis of the control phase current sensed value iw_sns of one phase.

Figure 4:
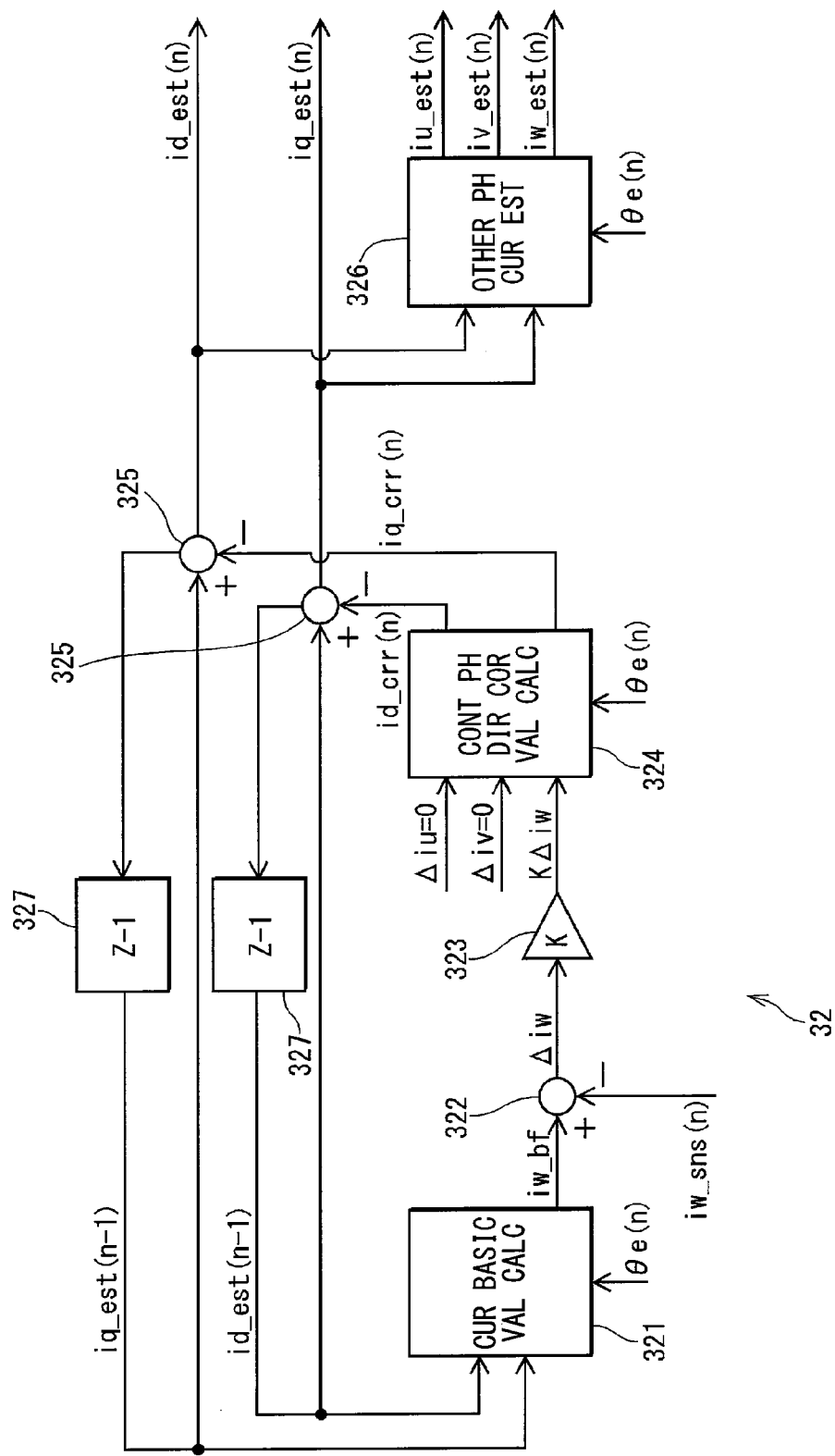
FIG. 4 is a block diagram to show a construction of a current estimation part of the first embodiment of the present disclosure.

As shown in FIG. 4, the current estimation part 32 has a current basic value calculation part 321, a subtractor 322, a gain correction part 323, a control phase direction correction value calculation part 324, subtractors 325, an other phase current estimation part 326, and delay elements 327. Here, when it is assumed that current estimation processing based on a current sensed value inputted this time is n-th processing and that a current sensed value of W phase and an electric angle, which are inputted this time, are "iw_sns (n)" and "θe (n)", the current estimated values acquired by the n-th processing are expressed by "i#_est (n)" (where # is d, q, u, v, w).

The current basic value calculation part 321 has a d-axis current estimated value id_est (n−1) and a q-axis current estimated value iq_est (n−1) inputted thereto, the d-axis current estimated value id_est (n−1) and the q-axis current estimated value iq_est (n−1) being calculated by the last calculation, that is, the (n−1)-th processing. The current basic value calculation part 321 inversely dq transforms the d-axis current estimated value id_est (n−1) and the q-axis current estimated value iq_est (n−1), which are calculated by the last calculation, by the use of the electric angle θe (n) to thereby calculate a current basic value iw_bf which is a control phase component.

The subtractor 322 calculates the control phase estimated error Δiw which is the difference between the current basic value iw_bf and the control phase current sensed value iw_sns (n).

The gain correction part 323 multiplies the control phase estimated error Δiw by a gain K to thereby calculate a corrected error KΔiw. Here, the gain K serves as a low pass filter (hereinafter referred to as "LPF"), which is set for the d-axis current estimated value id_est and the q-axis current estimated value iq_est, and moderates a change in the d-axis current estimated value id_est and the q-axis current estimated value iq_est (which will be later described in more detail). When it is assumed that the number of pieces of processing (time constant÷processing cycle) in a desired time constant of the LPF is Klpf, the value of the gain K is expressed by 1/Klpf and is within a range of 0<K<1.

The control phase direction correction value calculation part 324 dq transforms the corrected error KΔiw by assuming that Δiu=0 and Δiv=0 to thereby calculate the control phase direction correction values id_crr (n) and iq_crr (n). In the present embodiment, the control phase direction correction values id_crr (n) and iq_crr (n) correspond to "a correction vector". Hereinafter, in the case where the control phase direction correction values id_crr (n) and iq_crr (n) are treated as a vector, the vector is referred to as a correction vector (Δid, Δiq) as required.

The subtractors 325 subtract the control phase direction correction values id_crr (n) and iq_crr (n) from the d-axis current estimated value id_est (n−1) and the q-axis current estimated value iq_est (n−1) of the last processing, which are fed back via the delay elements 327, respectively, to thereby calculate a d-axis current estimated value id_est (n) and a q-axis current estimated value iq_est (n). Here, subtracting the control phase direction correction values id_crr (n) and iq_crr (n) from the d-axis current estimated value id_est (n−1) and the q-axis current estimated value iq_est (n−1) of the last processing by means of the subtractors 325 corresponds to "integrating the correction vector on the (d, q) axis plane".

Further, the d-axis current estimated value id_est (n) and the q-axis current estimated value iq_est (n), which are calculated in this way, are fed back to the current basic value calculation part 321 via the delay elements 327.

The other current estimation part 326 inversely dq transforms the d-axis current estimated value id_est (n) and the q-axis current estimated value iq_est (n) on the basis of the electric angle θe (n) to thereby calculate the current estimated values iu_est (n), iv_est (n), and iw_est (n) of three phases. In this regard, as required, a current estimated value of only a necessary phase, for example, only the current estimated value iv_est (n) of the V phase may be calculated. In the present embodiment, the current estimated value iv_est (n) of only the V phase of the monitor phase is calculated.

Here, a recurrence equation expressing the calculation in the current estimation part 32 will be shown by an equation (5) in which θw (n)=θe (n)+120°. Further, K cos (θw (n)) Δiw in the equation (5) corresponds to the d-axis control phase direction correction value id_crr (n) and −K sin (θw (n)) Δiw in the equation (5) corresponds to the q-axis control phase direction correction value iq_crr (n).

[Mathematical formula 3]

$$\begin{bmatrix} \text{id\_est}(n) \\ \text{iq\_est}(n) \end{bmatrix} = \begin{bmatrix} \text{id\_est}(n-1) \\ \text{iq\_est}(n-1) \end{bmatrix} - K \begin{bmatrix} \cos(\theta w(n)) \\ -\sin(\theta w(n)) \end{bmatrix} \Delta iw \quad (5)$$

Figure 6A:
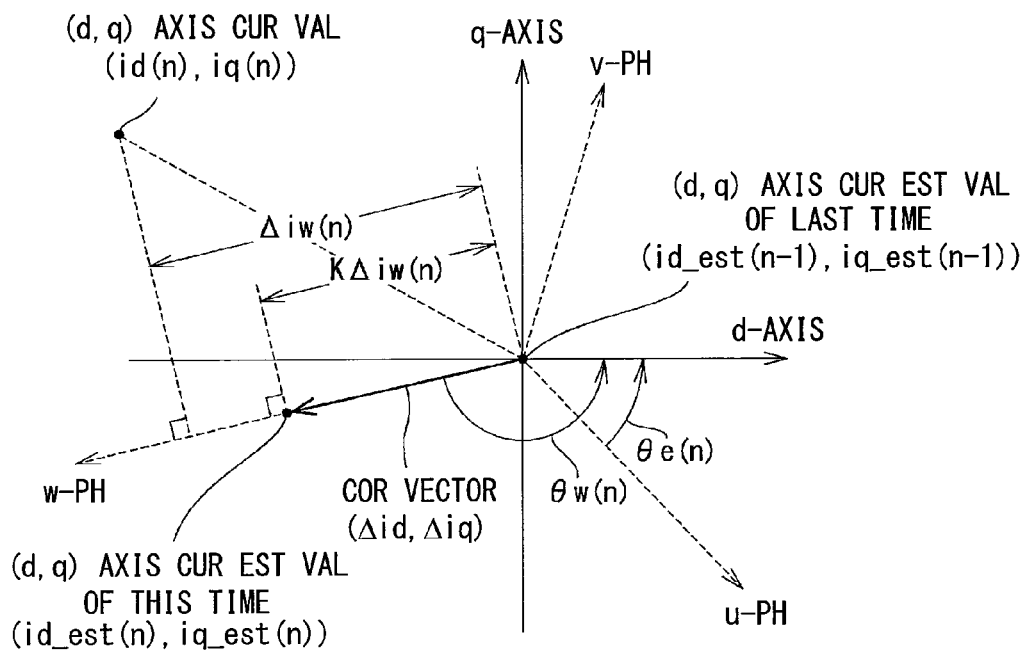
FIGS. 6A and 6B are illustrations to illustrate the current estimation according to the first embodiment of the present disclosure.
Figure 6B:
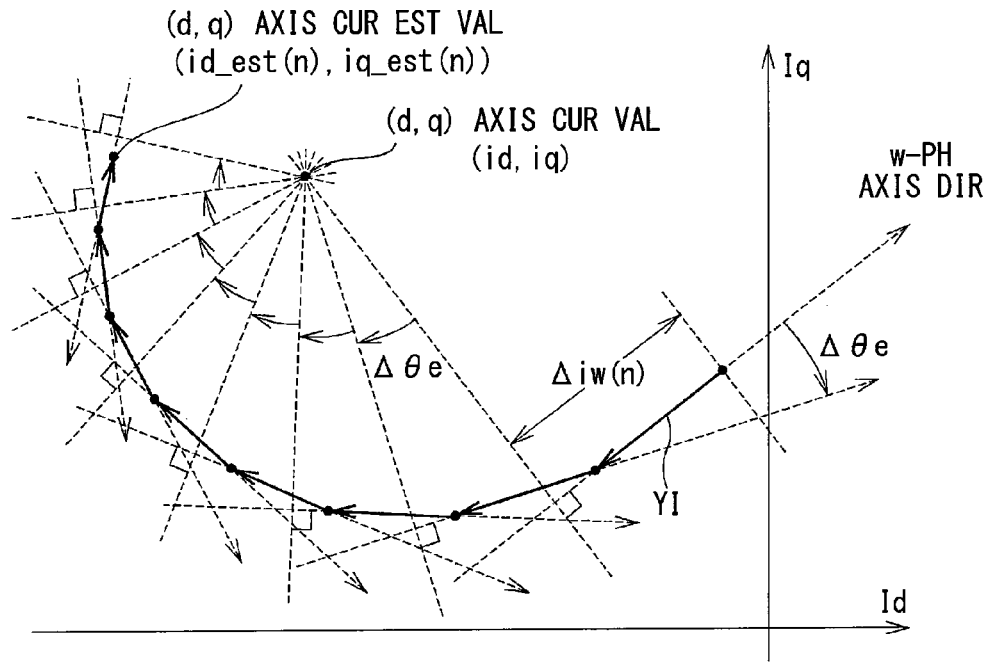

When the recurrence equation shown by the equation (5) is expressed by a vector diagram, the vector diagram shown in FIG. 6A is acquired. Here, in the present embodiment, the gain K is set in such a way that 0<K<1, so that as shown in FIG. 6B, in the (d,q) axis plane of the rotating coordinate system, by integrating the correction vector (Δid,Δiq) shown by an arrow YI by the use of the W-phase axis rotating relatively, the d-axis current estimated value id_est and the q-axis estimated value iq_est are made asymptotic to the d-axis current value id and the q-axis current value iq, respectively. In this way, the current estimation can be made with high accuracy on the basis of the current sensed value of one phase of the control phase.

Here, the gain K is a filter element for controlling a speed at which the d-axis current estimated value id_est and the q-axis estimated value iq_est are made asymptotic to the d-axis current value id and the q-axis current value iq, respectively. Further, when the gain K is too large, that is, a value comparatively close to 1, the error vector Δie (see FIG. 5) is closely perpendicular to the W-phase axis and hence moves in a circumferential direction of a circle with a center at a point having the coordinates of (the d-axis current value id, the q-axis current value) and draws a vortex, which hence makes it difficult for the d-axis current estimated value id_est and the q-axis estimated value iq_est to be asymptotic to the d-axis current value id and the q-axis current value iq, respectively. Hence, in consideration of this point, the gain K, which can easily make the d-axis current estimated value id_est and the q-axis estimated value iq_est asymptotic to the d-axis current value id and the q-axis current value iq, respectively, can be appropriately set within a range of 0<K<1.

Returning to FIG. 3, the current selection part 35 selects whether the current values, which are to be fed back to the PI calculation part 22, are made the d-axis current value id and the q-axis current value iq or the d-axis current estimated value id_est and the q-axis current estimated value iq_est. In the present embodiment, the current values, which are to be fed back to the PI calculation part 22 from the current selection part 35, are switched according to the number of revolutions N. Switching of the current values, which are to be fed back to the PI calculation part 22, will be later described in detail. Here, hereinafter, as required, the operation of feeding back the d-axis current value id and the q-axis current value iq to the PI calculation part 22 to thereby control the AC motor 2 is referred to as "two-phase control", whereas the operation of feeding back the d-axis current estimated value id_est and the q-axis current estimated value iq_est to the PI calculation part 22 to thereby control the AC motor 2 is referred to as "one-phase control".

The control phase current estimation part 41 calculates a control phase current estimated value iw_est on the basis of the monitor phase current sensed value iv_sns and the electric angle θe. Calculation in the control phase current estimation part 41 is the same as calculation in the current estimation part 32. When making a supplementary comment, the d-axis current estimated value id_est and the q-axis current estimated value iq_est, which are calculated by the use of the monitor phase current sensed value iv_sns in place of the control phase current sensed value iw_sns and on the basis of the monitor phase current sensed value iv_sns, correspond to "one-phase current sensed values for monitoring", and a component of the monitor phase of the d-axis current estimated value id_est and the q-axis current estimated value iq_est, which are calculated on the basis of the monitor phase current sensed value iv_sns, is a monitor phase current basic value iv_bf, and a monitor phase direction correction value calculated by dq transforming a KΔiv, which is a value acquired by multiplying the monitor phase current basic value iv_bf by the gain K, corresponds to "a monitor phase correction vector".

The control phase current comparison part 42 compares the control phase current estimated value iw_est with the control phase current sensed value iw_sns. Specifically, the control phase current comparison part 42 calculates a control phase difference reference value Δiw_ref which is a value acquired by filtering the difference between the control phase current estimated value iw_est and the control phase current sensed value iw_sns by a LPF. The control phase difference reference value Δiw_ref corresponds to "a second comparison result".

The monitor phase current comparison part 43 compares the monitor phase current estimated value iv_est with the monitor phase current sensed value iv_sns. Specifically, the monitor phase current comparison part 43 calculates a monitor phase difference reference value Δiv_ref which is a value acquired by filtering the difference between the monitor phase current estimated value iv_est and the monitor phase current sensed value iv_sns by the LPF. The monitor phase difference reference value Δiv_ref corresponds to "a first comparison result".

Here, as to the respective difference reference values Δiw_ref and Δiv_ref, when the difference between the control phase current estimated value iw_est and the control phase current sensed value iw_sns is simply filtered by the LPF and the difference between the monitor phase current estimated value iv_est and the monitor phase current sensed value iv_sns is simply filtered by the LPF processing, it is impossible to detect the case where the deviation becomes plus and minus and hence the average becomes zero, for example, the case of a gain error. When attention is paid to this point, the respective differences do not need to be filtered by the LPF. However, when the control phase current sensed value iw_sns and the monitor phase current sensed value iv_sns are suddenly changed by noise and an instantaneous external disturbance, a false detection might be caused and hence it is desired to filter the respective differences by a suitable LPF. Further, depending on the electric frequency of the current and the time constant of the filter, it is more desirable to acquire an absolute value in such a way as to detect also the case where the deviation becomes plus and minus and where an error becomes apparently small when averaged, as is the case of the gain error.

The abnormality determination part 45 detects an abnormality of the control phase current sensor 12 and the monitor phase current sensor 13 on the basis of the respective difference reference values iw_ref, Δiv_ref. In the present embodiment, in the case where at least one of the difference reference values iw_ref, Δiv_ref is larger than an abnormality determination threshold value R, it is determined that an abnormality is caused in at least one of the control phase current sensor 12 and the monitor phase current sensor 13. In the case where it is determined that an abnormality is caused in at least one of the control phase current sensor 12 and the monitor phase current sensor 13, information to the effect that an abnormality is caused in at least one of the control phase current sensor 12 and the monitor phase current sensor 13 is sent to the vehicle control circuit 9, whereby the drive of the AC motor 2 by the electric motor control device 10 is stopped.

By the way, as described in FIGS. 6A and 6B, the current estimation part 32 integrates the correction vector (Δid,Δiq) shown by the arrow YI by the use of the W-phase axis rotating relatively on the (d,q) axis plane of the rotating coordinate system to thereby make the d-axis current estimated value id_est and the q-axis current estimated value iq_est asymptotic to the d-axis current value id and the q-axis current value iq, respectively.

Here, FIGS. 7A, 7B, and 7C and FIGS. 8A, 8B, and 8C show the state in which the W-phase axis rotates on the (d,q)-axis plane like (A)→(B)→(C).

Figure 7A:
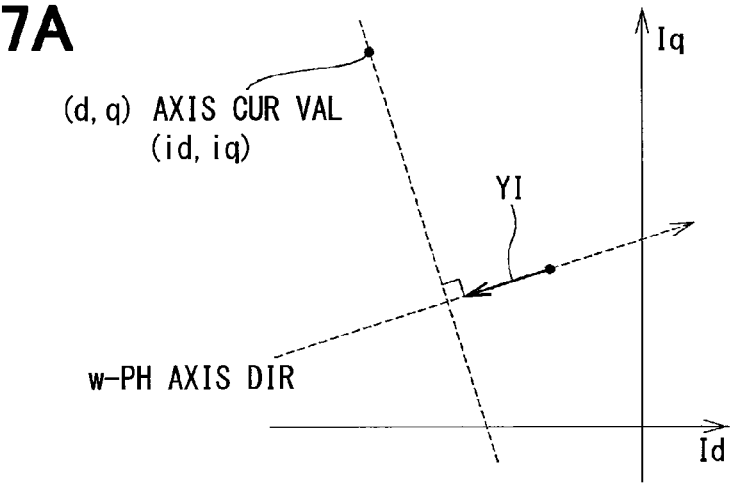
FIGS. 7A, 7B, and 7C are illustrations to illustrate a current estimation in the case where the number of revolutions is large in the first embodiment of the present disclosure.
Figure 7B:
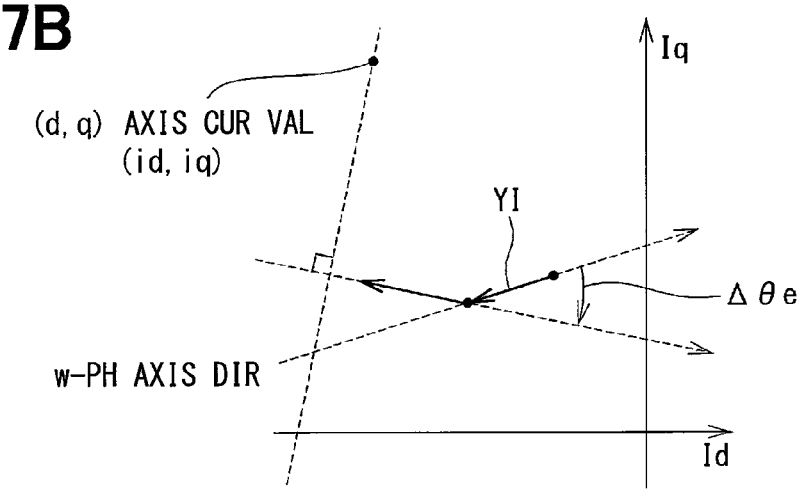
Figure 7C:
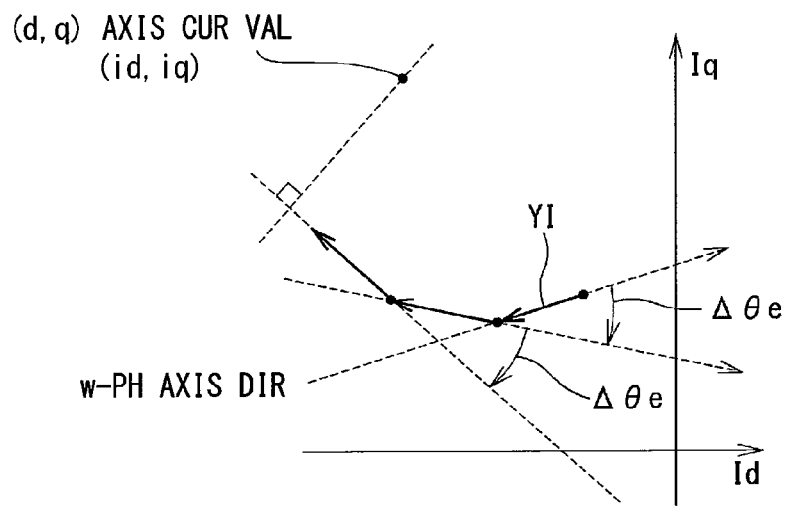

As shown in FIGS. 7A, 7B, and 7C, in the case where an angular movement $\Delta\theta e$ of the electric angle $\theta e$ is comparatively large, that is, the number of revolutions N of the AC motor 2 is large, the control phase estimated error Δiw which is the W-phase component of the error vector Δie (see FIG. 5) is large, so that when the d-axis current estimated value id_est and the q-axis current estimated value iq_est converge to the d-axis current value id and the q-axis current value iq, respectively, the amount of convergence becomes large.

Figure 8A:
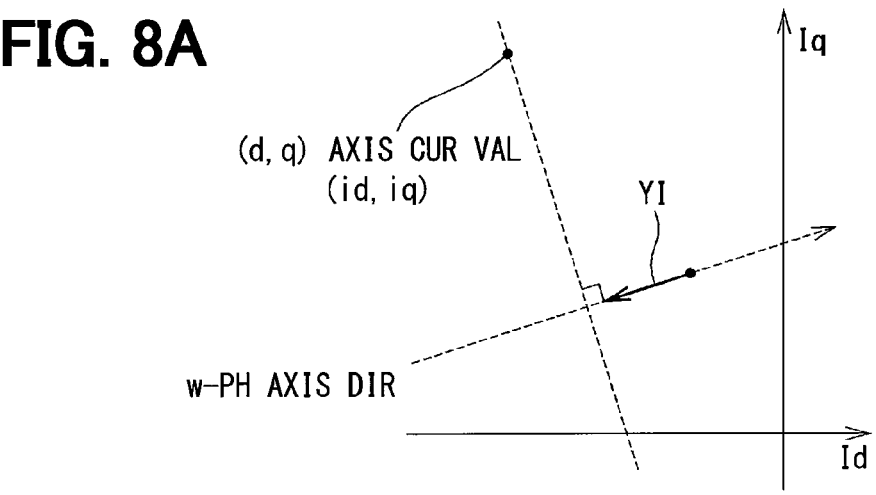
FIGS. 8A, 8B, and 8C are illustrations to illustrate a current estimation in the case where the number of revolutions is small in the first embodiment of the present disclosure.
Figure 8B:
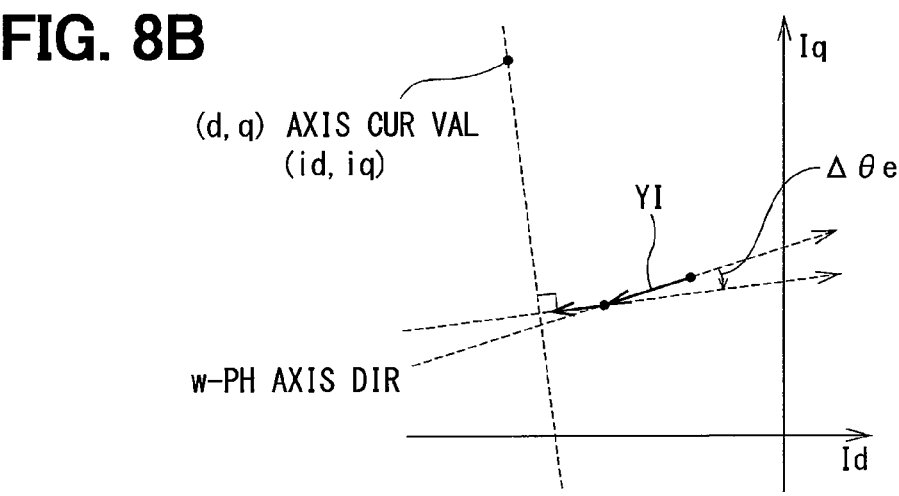
Figure 8C:
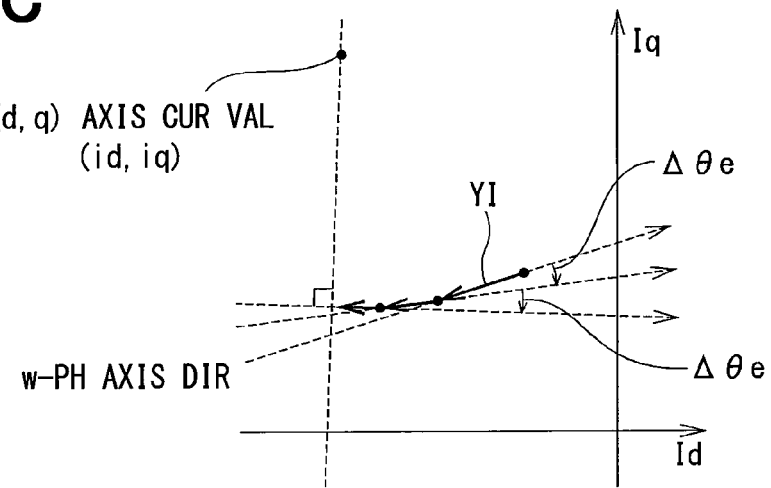

On the other hand, as shown in FIGS. 8A, 8B, and 8C, in the case where an angular movement $\Delta\theta e$ of the electric angle $\theta e$ is comparatively small, that is, the number of revolutions N of the AC motor 2 is small, the control phase estimated error Δiw which is the W-phase component of the error vector Δie is small and hence the error vector Δie is nearly perpendicular to the W-phase axis, so that when the d-axis current estimated value id_est and the q-axis current estimated value iq_est converge to the d-axis current value id and the q-axis current value iq, respectively, the amount of convergence becomes small. Hence, in the case where the number of revolutions N of the AC motor 2 is small, in some cases, the estimation accuracy of the d-axis current estimated values id_est and the q-axis current estimated value iq_est becomes worse as compared with the case where the number of revolutions N is large.

Hence, in the present embodiment, in order to control the AC motor 2 with high accuracy in the case where the number of revolutions N of the AC motor 2 is small, as shown in FIG. 3, the control section 15 has the number-of-revolutions calculation part 51 and the number-of-revolutions determination part 52.

The number-of-revolutions calculation part 51 calculates the number of revolutions N of the AC motor 2 on the basis of the electric angle $\theta e$ acquired by the rotation angle sensor 14.

The number-of-revolutions determination part 52 determines whether or not the number of revolutions N of the AC motor 2 is larger than a given determination value X. As described above, it has been found that when the number of revolutions N of the AC motor 2 is small, for example, the motor is locked, the estimation accuracy with which the d-axis current estimated value id_est and the q-axis current estimated value iq_est are estimated from the control phase current sensed value iw_sns becomes worse. Further, since various kinds of values are expressed by discrete values in the control section 15, even if the AC motor 2 is not completely stopped, the estimation accuracy is likely to become worse within a certain range of low rotation. Hence, in the present embodiment, in the case where the number of revolutions N of the AC motor 2 is not larger than the given determination value X, a control mode is switched to a two-phase control mode, whereby the two-phase control is performed. Here, the determination value X of the number of revolutions N of the AC motor 2 can be set appropriately at the number of revolutions at which the estimation accuracy of the d-axis current estimated value id_est and the q-axis current estimated value iq_est becomes better, for example, at 1500 rpm. Here, the determination value X of the number of revolutions N of the AC motor 2 is different according to the number of poles and hence is set appropriately in consideration of the number of poles.

Here, current feedback processing performed by the control section 15 of the present embodiment will be described on the basis of a flow chart shown in FIG. 9. The current feedback processing is performed at given intervals (for example, at intervals of 100 μsec).

In a first step S101 (hereinafter, "step" is omitted and is expressed simply by a symbol "S"), the electric angle $\theta e$ of the AC motor 2 is acquired from the rotation angle sensor 14.

In S102, the control phase current sensed value iw_sns is acquired from the control phase current sensor 12, and the monitor phase current sensed value iv_sns is acquired from the monitor phase current sensor 13.

In S103, the two-phase control current calculation part 31 calculates the d-axis current value id and the q-axis current value iq on the basis of the control phase current sensed value iw_sns, the monitor phase current sensed value iv_sns, and the electric angle $\theta e$.

In S104, the current estimation part 32 calculates the d-axis current estimated values id_est and the q-axis current estimated value iq_est and the monitor phase current estimated value iv_est on the basis of the control phase current sensed value iw_sns and the electric angle $\theta e$. Further, the control phase current estimation part 41 calculates the control phase current estimated value iw_est on the basis of the monitor phase current sensed value iv_sns and the electric angle $\theta e$.

In S105, the number-of-revolutions calculation part 51 calculates the number of revolutions N of the AC motor 2 on the basis of the electric angle $\theta e$.

In S106, the number-of-revolutions determination part 52 determines whether or not the number of revolutions N is larger than the given determination value X. If it is determined that the number of revolutions N is larger than the given determination value X (S106: YES), the procedure proceeds to S108. Processing of S108 and processing of S109 which are performed in the case where it is determined that S106 is affirmative correspond to "a one-phase control mode". If it is determined that the number of revolutions N is not larger than the given determination value X (S106: NO), the procedure proceeds to S107. Processing of S107 performed in the case where it is determined that S106 is negative corresponds to "the two-phase control mode".

In S107, the current selection part 35 selects the d-axis current value id and the q-axis current value iq as currents to be fed back to the PI calculation part 22, the d-axis current value id and the q-axis current value iq being calculated by the two-phase control current calculation part 31 by the use of the control phase current sensed value iw_sns and the monitor phase current sensed value iv_sns.

In S108 to which the procedure proceeds in the case where it is determined that the number of revolutions N is larger than the determination value X (S106: YES), the current selection part 35 selects the d-axis current estimated value id_est and the q-axis current estimated value iq_est as currents to be fed back to the PI calculation part 22, the d-axis current estimated value id_est and the q-axis current estimated value iq_est being calculated by the current estimation part 32 by the use of the control phase current sensed value iw_sns.

In S109, the abnormality determination part 45 determines whether or not the control phase current sensor 12 and the monitor phase current sensor 13 are abnormal. If at least one of the control phase difference reference value Δiw_ref, which is calculated by the control phase current comparison part 42, and the monitor phase difference reference value Δiv_ref, which is calculated by the monitor phase current comparison part 43, is larger than an abnormality determination threshold value R, the abnormality determination part 45 determines that an abnormality is caused in at least one of the control phase current sensor 12 and the monitor phase current sensor 13 and sets a current sensor abnormality flag.

In S110, it is determined whether or not an abnormality is caused in at least one of the control phase current sensor 12 and the monitor phase current sensor 13. In the present embodiment, the determination is made on the basis of the current sensor abnormality flag. If it is determined that an abnormality is not caused in the control phase current sensor 12 and the monitor phase current sensor 13 (S110: NO), that is, the current abnormality flag is not set, the procedure proceeds to S112. If it is determined that an abnormality is caused in at least one of the control phase current sensor 12 and the monitor phase current sensor 13 (S110: YES), that is, the current abnormality flag is set, the procedure proceeds to S111.

In S111, information to the effect that an abnormality is caused in at least one of the control phase current sensor 12 and the monitor phase current sensor 13 is sent to the vehicle control circuit 9, whereby the drive of the AC motor 2 by the electric motor control device 10 is stopped.

If it is determined that S110 is negative, or in S112 to which the procedure proceeds after S107, the PI calculation part 22 performs PI calculation on the basis of the d-axis current value id and the q-axis current value iq or the d-axis current estimated value id_est and the q-axis current estimated value iq_est, which are fed back from the current selection part 35, to thereby calculate the d-axis voltage command value vd* and the q-axis voltage command value vq*.

In S113, the inverse dq transformation part 23 inversely dq transforms the d-axis voltage command value vd* and the q-axis voltage command value vq* on the basis the electric angle θe to thereby calculate three-phase voltage command values vu*, vv*, and vw*.

In S114, the three-phase command values vu*, vv*, and vw* are outputted to the inverter 11. In the inverter 11, the switching elements are switched on/off on the basis of the three-phase command values vu*, vv*, and vw* and hence three-phase AC voltages are generated. Then, the three-phase AC voltages are impressed on the AC motor 2, whereby the drive of the AC motor 2 is controlled.

Figure 10:
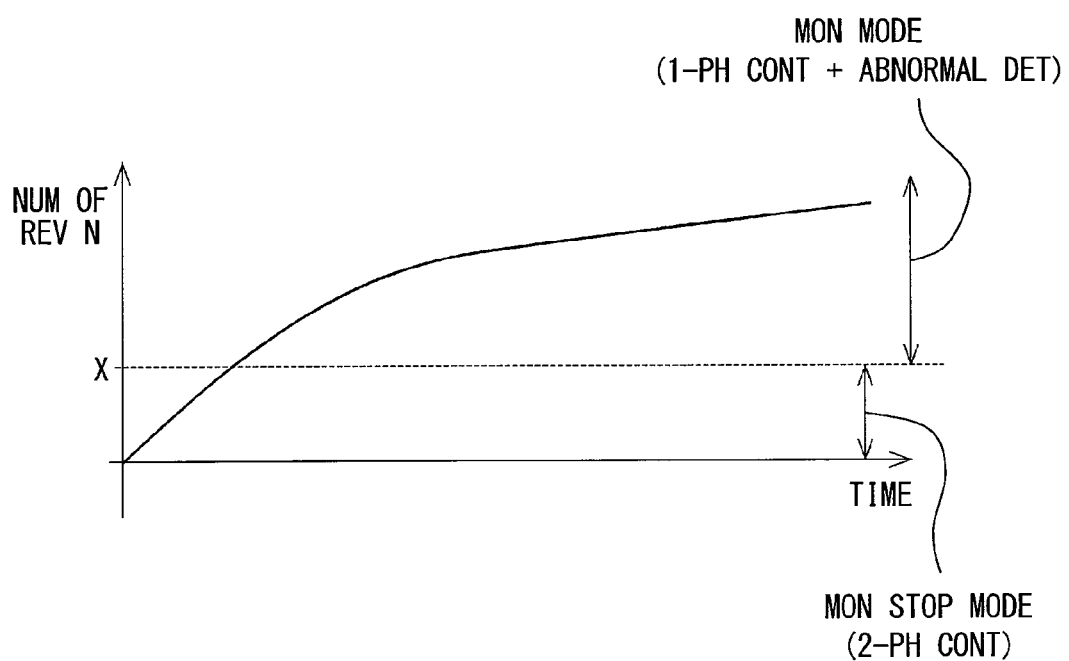
FIG. 10 is an illustration to illustrate the number of revolutions and the switching of mode of the first embodiment of the present disclosure.

In the present embodiment, as shown in FIG. 10, if the number of revolutions N is not larger than the determination value X (S106: NO), the control mode is made the two-phase control mode, whereby the two-phase control is performed. Further, if the number of revolutions N is larger than the determination value X (S106:YES), the control mode is made the one-phase control mode, whereby the one-phase control is performed and an abnormality of the control phase current sensor 12 and the monitor phase current sensor 13 is detected. In this way, it is possible to suitably detect an abnormality being caused in at least one of the control phase current sensor 12 and the monitor phase current sensor 13. Further, in a low rotation range in which the estimation accuracy of the d-axis current estimated value id_est and the q-axis current estimated value iq_est is likely to become worse, the d-axis current estimated value id_est and the q-axis current estimated value iq_est are not used for the control of the AC motor 2 but the d-axis current value id and the q-axis current value iq, which are actual current values based on the control phase current sensed value iw_sns and the monitor phase current sensed value iv_sns, are used for the control of the AC motor 2. Hence, even in the low rotation range, the AC motor 2 can be controlled with high accuracy.

As described above in detail, the electric motor control device 10 of the present embodiment controls the drive of the three-phase AC motor 2 in which impressed voltages vu, vv, vw are controlled by the inverter 11. In the control section 15, the following processing is performed.

Figure 9:
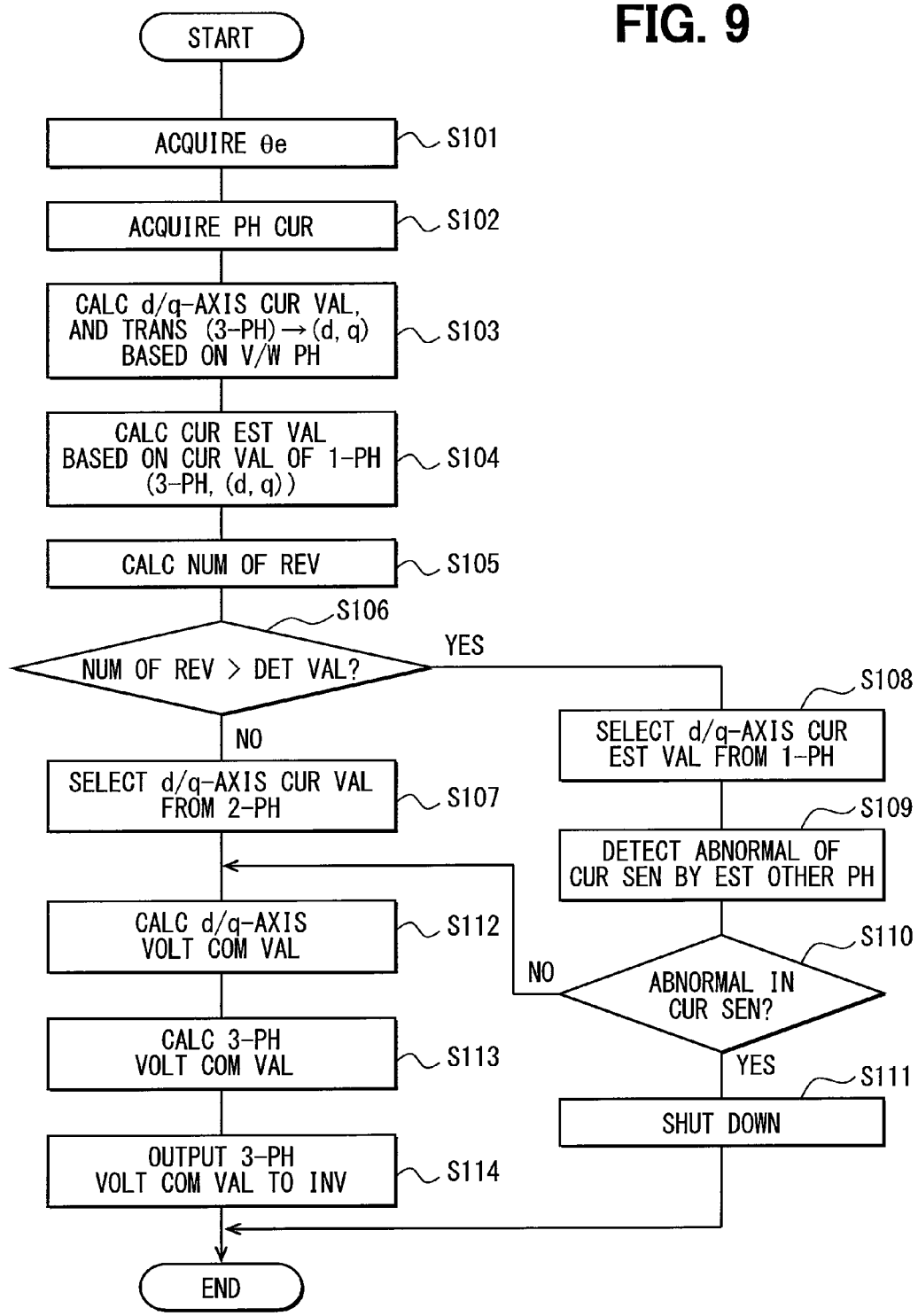
FIG. 9 is a flow chart to show current feedback control processing of the first embodiment of the present disclosure.

The control phase current sensed value iw_sns is acquired from the control phase current sensor 12 disposed for the control phase (W phase in the present embodiment) which is any one phase of the AC motor 2, and the monitor phase current sensed value iv_sns is acquired from the monitor phase current sensor 13 disposed for the monitor phase (V phase in the present embodiment) which is one phase different from the control phase of the AC motor 2 (S102 in FIG. 9). Further, the electric angle θe is acquired from the rotation angle sensor 14 for sensing the rotation angle of the AC motor 2 (S101).

The two-phase control current calculation part 31 calculates the d-axis current value id and the q-axis current value iq on the basis of the control phase current sensed value iw_sns, the monitor phase current sensed value iv_sns, and the electric angle θe (S103).

The current estimation part 32 calculates the d-axis current estimated value id_est and the q-axis current estimated value iq_est on the basis of the control phase current sensed value iw_sns and the electric angle θe (S104). In the present embodiment, the current estimation part 32 calculates the d-axis current estimated values id_est and the q-axis current estimated value iq_est by integrating the control phase direction correction values id_crr, iq_crr in the control phase direction, the control phase direction correction values id_crr, iq_crr being calculated on the basis of the current basic value iw_bf and the control phase current sensed value iw_sns which are control phase components of the d-axis current estimated value id_est and the q-axis current estimated value iq_est, which are calculated by the calculation of the last time, and rotating relatively on the (d,q) axis plane of the rotating coordinate system.

The PI calculation part 22 calculates the voltage command values vd*, vq* on the basis of the d-axis current value id and the q-axis current value iq or the d-axis current estimated value id_est and the q-axis current estimated value iq_est, which are fed back from the current selection part 35 (S112).

Further, the current estimation part 32 calculates the monitor phase current estimated value iv_est, which is estimated on the basis of the control phase current sensed value iw_sns and the electric angle θe, and the control phase current estimation part 41 calculates the control phase current estimated value iw_est, which is estimated on the basis of the monitor phase current sensed value iv_sns and the electric angle θe (S109). The abnormality determination part 45 detects an abnormality being caused in at least one of the control phase current sensor 12 and the monitor phase current sensor 13 on the basis of at least one of the monitor phase difference reference value Δiv_ref and the control phase difference reference value Δiw_ref, the monitor phase difference reference value Δiv_ref being a comparison result between the monitor phase current estimated value iv_est and the monitor phase current sensed value iv_sns, the control phase difference reference value Δiw_ref being a comparison result between the control phase current estimated value iw_est and the control phase current sensed value iw_sns (S109).

In the present embodiment, the number-of-revolutions calculation part 51 calculates the number of revolutions N of the AC motor 2 on the basis of the electric angle θe (S105), and the number-of-revolutions determination part 52 determines whether or not the number of revolutions N is not larger than the given determination value X (S106).

The current selection part 35 switches between the two-phase control mode and the one-phase control mode, the two-phase control mode calculating the voltage command values vd*, vq* on the basis of the d-axis current value id and the q-axis current value iq, the one-phase control mode calculating the voltage command values vd*, vq* on the basis of the d-axis current estimated values id_est and the q-axis current estimated value iq_est and detecting an abnormality of the control phase current sensor 12 and the monitor phase current sensor 13. In the present embodiment, if it is determined that the number of revolutions N is not larger than the determination value X (S106: NO), the two-phase control mode is selected, whereas if it is determined that the number of revolutions N is larger than the determination value X (S106: YES), the one-phase control mode is selected. Specifically, if it is determined that the number of revolutions N is not larger than the determination value X, the currents to be fed back to the PI calculation part 22 from the current selection part 35 are made the d-axis current value id and the q-axis current value iq, whereas if it is determined that the number of revolutions N is larger the determination value X, the currents to be fed back to the PI calculation part 22 from the current selection part 35 are made the d-axis current estimated value id_est and the q-axis current estimated value iq_est.

In the present embodiment, if the number of revolutions N is not larger than the determination value X, the current feedback control is performed in the two-phase control mode at high speed and with high accuracy by the use of the control phase current sensed value iw_sns and the monitor phase current sensed value iv_sns, which are the current sensed values of two phases. On the other hand, if the number of revolutions N is larger than the determination value X, the one-phase control mode is selected and the monitor phase current sensed value iv_sns is not used for the current feedback control but the current feedback control is performed by the use of the d-axis current estimated value id_est and the q-axis current estimated value iq_est which are calculated by the use of the control phase current sensed value iw_sns, which hence makes it possible to prevent the current feedback control from interfering with the monitor phase current sensed value iv_sns and to detect an abnormality of the control phase current sensor 12 and the monitor phase current sensor 13. Further, in the present embodiment, the abnormality of the control phase current sensor 12 and the monitor phase current sensor 13 is detected on the basis of the difference reference values Δiw_ref, Δiv_ref, which are the comparison results between the estimated values and the sensed values. Here, one of the sensed value and the estimated value which are compared with each other is not used for the current feedback control and hence is the monitor phase current sensed value iv_sns itself independent of a current feedback loop or the control phase current estimated value iw_est based on the monitor phase current sensed value iv_sns and hence is not affected by the interference of the current feedback control.

Specifically, the control phase current estimated value iw_est estimated by the control phase current estimation part 41 is calculated on the basis of the monitor phase current sensed value iv_sns, which is not used for the calculation of the d-axis current estimated value id_est and the q-axis current estimated value iq_est in the current estimation part 32 at the time of the one-phase control, and hence is not affected by the interference of the current feedback control. Further, the monitor phase current sensed value iv_sns used for comparison in the monitor phase current comparison part 43 is not affected by the interference of the current feedback control, either.

In this way, it is possible to suitably detect an abnormality of the current sensors, in more detail, an abnormality being caused in at least one of the control phase current sensor 12 and the monitor phase current sensor 13. Hence, the abnormality can be suitably detected.

Further, in the present embodiment, the abnormality of the control phase current sensor 12 and the monitor phase current sensor 13 is detected on the basis of the two difference reference values Δiw_ref, Δiv_ref, so that the abnormality can be more suitably detected.

Further, the current estimation part 32 calculates the d-axis current estimated value id_est and the q-axis current estimated value iq_est by integrating the control phase direction correction values id_crr, iq_crr on the (d,q) axis plane. In more detail, the current estimation part 32 integrates the control phase direction correction values id_crr, iq_crr in the control phase direction on the (d,q) axis plane.

In this way, the current estimation part 32 calculates the d-axis current estimated value id_est and the q-axis current value estimated value iq_est by the use of the control phase direction correction values id_crr, iq_crr, which are information changed along with the rotation of the AC motor 2. Hence, two-dimensional quantities can be estimated by adding a remaining one-dimensional component to the control phase current sensed value iw_sns, whereby a two-dimensional vector control can be performed with high accuracy.

Here, when an angular movement Δθe of the electric angle θe of the AC motor 2 is small, that is, the number of revolutions N of the AC motor 2 is small, the control phase direction correction values id_crr, iq_crr are small in the amount of change, which hence is likely to impair the controllability of the AC motor 2.

Hence, in the present embodiment, at the time of low rotation in which the estimation accuracy of the d-axis current estimated value id_est and the q-axis current estimated value iq_est is likely to become worse, the d-axis current value id and the q-axis current value iq of the actual current values are calculated not by the use of the d-axis current estimated value id_est and the q-axis current estimated value iq_est but by the use of the control phase current sensed value iw_sns and the monitor phase current sensed value iv_sns, and the AC motor 2 is controlled on the basis of the voltage command values vd*, vq* which are calculated on the basis of the calculated d-axis current value id and the calculated q-axis current value iq. In other words, at the time of low rotation in which the estimation accuracy of the d-axis current estimated value id_est and the q-axis current estimated value iq_est is likely to become worse, the monitor phase current sensed value iv_sns acquired from the monitor phase current sensor 13 is used for "controlling". Further, in the one-phase control mode for detecting an abnormality of the control phase current sensor 12 and the monitor phase current sensor 13, the monitor phase current sensed value iv_sns acquired from the monitor phase current sensor 13 is used for "monitoring".

In this way, it is possible to prevent the controllability of the AC motor 2 from being impaired at the time of low rotation. Further, in the present embodiment, the AC motor 2 is applied to a main motor of a hybrid vehicle or an electric vehicle, so that by controlling the AC motor 2 with high accuracy, it is possible to prevent drivability from being impaired by an abnormal torque caused by an abnormal current being passed and to prevent the heat generation and the failures of various kinds of elements constructing the control device. Further, it is possible to prevent sudden start which is caused by a user depressing an accelerator pedal more than required because a desired torque is not produced by current being too small and which is caused by torque developed suddenly when the estimation accuracy of current is improved.

Further, the current estimation part 32 calculates the monitor phase current estimated value iv_est on the basis of the d-axis current estimated value id_est and the q-axis current estimated value iq_est.

Still further, the control phase current estimation part 41 calculates the one-phase current estimated values for monitoring ((d,q) axis current estimated value) based on the monitor phase current sensed value iv_sns and the electric angle θe, and calculates the one-phase current estimated value for monitoring by integrating a monitor phase correction vector on the (d,q) axis plane, the monitor phase correction vector being calculated on the basis of the monitor phase current basic value iv_bf and the monitor phase current sensed value iv_sns which are monitor phase components of the one-phase control current value for monitoring, which is calculated in the last calculation. Then, the control phase current estimation part 41 calculates the control phase current estimated value iw_est on the basis of the calculated one-phase current estimated value for monitoring.

In the present embodiment, the two-phase current calculation part 31 calculates the d-axis current value id and the q-axis current value iq in both of the one-phase control mode and the two-phase control mode. Further, the current estimation part 32 calculates the d-axis current estimated value id_est and the q-axis current estimated value iq_est and the monitor phase current estimated value iv_est in both of the one-phase control mode and the two-phase control mode. Similarly, the control phase current estimation part 41 calculates the control phase current estimated values iw_est in both of the one-phase control mode and the two-phase control mode.

In other words, in the present embodiment, the d-axis current estimated value id_est and the q-axis current estimated value iq_est are calculated even in the two-phase control mode for performing the two-phase control. For this reason, even in the calculation including the filter system like the calculation method in the current estimation part 32 of the present embodiment, the state can be kept in which the error between the d-axis current estimated value id_est and the d-axis current value id and the error between the q-axis current estimated value iq_est and the q-axis current value iq are small. In this way, when the two-phase control mode is switched to the one-phase control mode, that is, the two-phase control is switched to the one-phase control, it is possible to prevent the control of the AC motor 2 from being made unstable by the error between the d-axis current estimated value id_est and the d-axis current value id and by the error between the q-axis current estimated value iq_est and the q-axis current value iq.

In the present embodiment, the control section 15 constructs "a control phase current acquisition means", "a monitor phase current acquisition means", "a rotation angle acquisition means", "a current calculation means", "a current estimation means", "a voltage command calculation means", "an other phase current estimation means", "an abnormality detection means", "a switching means", "a number-of-revolutions calculation means", and "a number-of-revolutions determination means". In more detail, the two-phase control current calculation part 31, the current estimation part 32, and the control phase current comparison part 42 construct "the control phase current acquisition means". The control phase current estimation part 41 and the monitor phase current comparison part 43 construct "the monitor phase current acquisition means". The PI calculation part 22, the two-phase control current calculation part 31, the current estimation part 32, the control phase current estimation part 41, and the number-of-revolutions calculation part 51 construct "the rotation angle acquisition part". Further, the two-phase control current calculation part 31 constructs "the current calculation means", and the current estimation part 32 constructs "the current estimation means", and the PI calculation part 22 constructs "the voltage command value calculation means". Still further, the current estimation part 32 and the control phase current estimation part 41 construct "the other phase current estimation means", and the abnormality determination part 45 constructs "the abnormality determination means", and the current selection part 35 constructs "the switching means", and the number-of-revolutions calculation part 51 constructs "the number-of-revolutions calculation means", and the number-of-revolutions determination part 52 constructs "the number-of-revolutions determination means".

In addition, S102 in FIG. 9 corresponds to processing as the functions of "the control phase current acquisition means" and "the monitor phase current acquisition means", and S101 corresponds to processing as the function of "the rotation angle acquisition means", and S103 corresponds to processing as the function of "the current calculation means", and S104 corresponds to processing as the functions of "the current estimation means" and "the other phase current estimation means", and S112 corresponds to processing as the function of "the voltage command current calculation means". Further, S109 corresponds to processing as the function of "the abnormality detection means", and S105 corresponds to processing as the function of "the number-of-revolutions calculation means", and S106 corresponds to processing as the function of "the number-of-revolutions determination means", and S107 and S108 correspond to processing as the function of "the switching means".

In the present embodiment, the electric angle θe corresponds to "the rotation angle sensed value", and the d-axis current value id and the q-axis current value iq correspond to "two-phase control current values", and the d-axis current estimated value id_est and the q-axis current estimated value iq_est correspond to "the one-phase current estimated values for controlling", and the monitor phase difference reference value Δiv_ref corresponds to "a first comparison result", and the control phase difference reference value Δiw_ref corresponds to "a second comparison result".

(Second Embodiment)

A control device of an AC motor according to a second embodiment of the present disclosure will be described on the basis of FIG. 11 and FIG. 12.

A second embodiment is different from the first embodiment in that: at the time of the two-phase control, the current estimation part 32 and the control phase current estimation part 41 do not perform current estimation processing; and at the time of the one-phase control, the two-phase control current calculation part 31 does not perform calculation processing. Hence, this point will be mainly described and the descriptions of the other constructions will be omitted.

Figure 11:
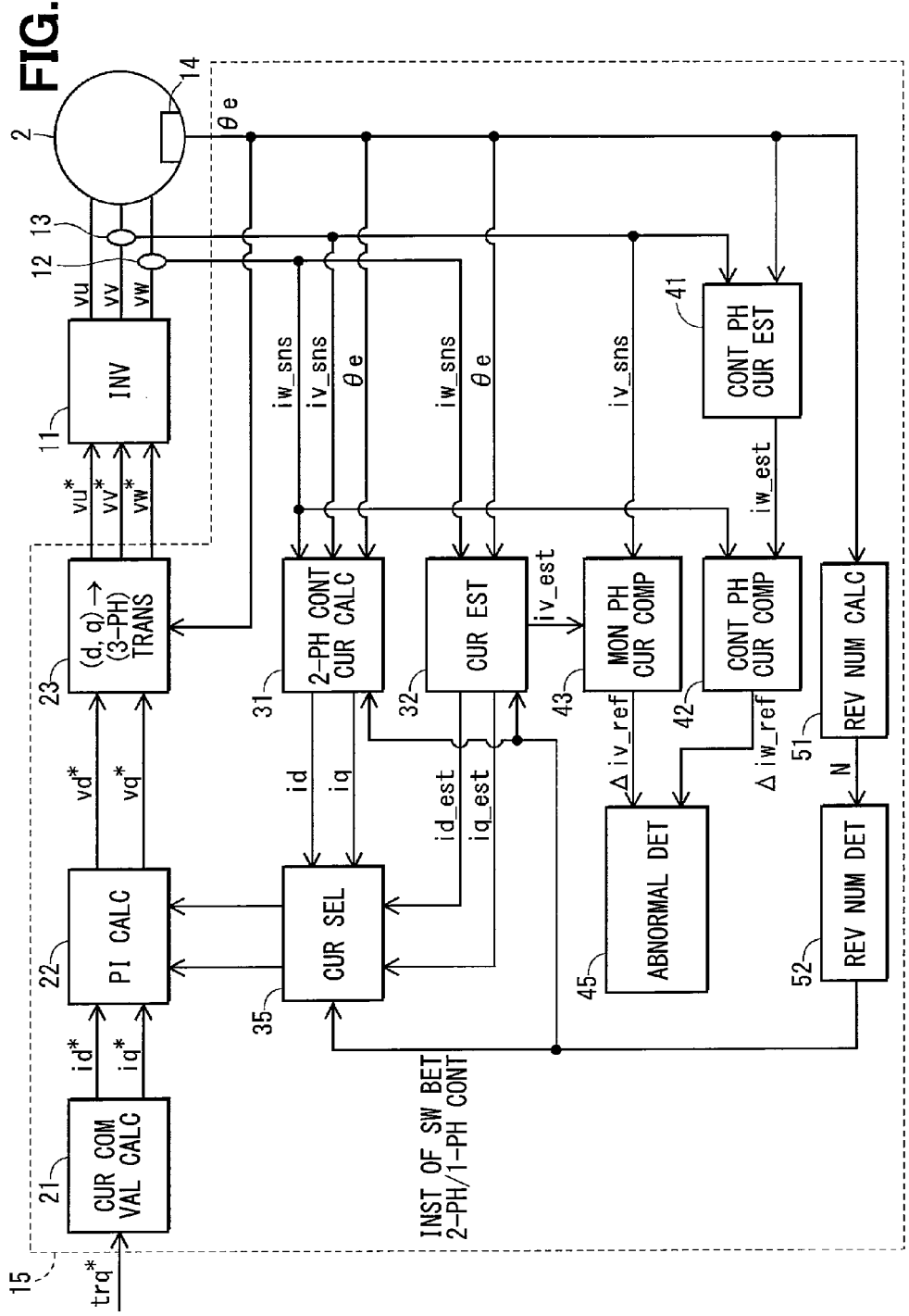
FIG. 11 is a block diagram to show a construction of an electric motor control device of a second embodiment of the present disclosure.

As shown in FIG. 11, if the number of revolutions N is not larger than the determination value X, that is, at the time of the two-phase control, the current estimation part 32 stops calculating the d-axis current estimated value id_est and the q-axis current estimated value iq_est. Further, if the number of revolutions N is larger than the determination value X, that is, at the time of the one-phase control, the two-phase control current calculation part 31 stops calculating the d-axis current value id and the q-axis current value iq.

Here, current feedback processing in the present embodiment will be described on the basis of FIG. 12. Pieces of processing of S201, S202 are the same as the pieces of processing of S101, S102 shown in FIG. 9 and hence their descriptions will be omitted.

Processing of S203 is the same as the processing of S105 and the number-of-revolutions calculation part 51 calculates the number of revolutions N on the basis of the electric angle θe.

S204 is number-of-revolutions determination processing. That is, in the present embodiment, before the number-of-revolutions determination processing, the two-phase control current calculation part 31 does not calculate the d-axis current value id and the q-axis current value iq and the current estimation part 32 does not calculate the d-axis current estimated value id_est and the q-axis current estimated value iq_est, which is different from the first embodiment.

In S204, it is determined whether or not the number of revolutions N is larger than the determination value X. If it is determined that the number of revolutions N is larger than the determination value X (S204: YES), the procedure proceeds to S207. Pieces of processing in S208, 209 performed in the case where it is determined that S204 is affirmative correspond to "the one-phase control mode". If it is determined that the number of revolutions N is not larger than the determination value X (S204: NO), the procedure proceeds to S205. Processing of S206 performed in the case where it is determined that S204 is negative corresponds to "the two-phase control mode".

Processing of S205 is the same as the processing of S103, and the two-phase control current calculation part 31 calculates the d-axis current value id and the q-axis current value iq.

The processing of S206 is the same as the processing of S107, and the current selection part 35 selects the d-axis current value id and the q-axis current value iq as the currents to be fed back to the PI calculation part 22, the d-axis current value id and the q-axis current value iq being calculated by the two-phase control current calculation part 31 by the use of the control phase current sensed value iw_sns and the monitor phase current sensed value iv_sns.

Processing of S207 to which the procedure proceeds in the case where it is determined that the number of revolutions N is larger than the determination value X (S204: YES) is the same as the processing of S104, and the current estimation part 32 calculates the d-axis current estimated value id_est, and the q-axis current estimated value iq_est, and the monitor phase current estimated value iv_est, and the control phase current estimation part 41 calculates the control phase current estimated value iw_est.

The processing of S208 is the same as the processing of S108, and the current selection part 35 selects the d-axis current estimated value id_est and the q-axis current estimated value iq_est as the currents to be fed back to the PI calculation part 22, the d-axis current estimated value id_est and the q-axis current estimated value iq_est being calculated by the current estimation part 32 by the use of the control phase current sensed value iw_sns.

Pieces of processing of S209 to S214 are the same as the pieces of processing of S109 to S114 and their descriptions will be omitted.

In the present embodiment, the two-phase control current calculation part 31 stops calculating the d-axis current value id and the q-axis current value iq in the one-phase control mode. Further, the current estimation part 32 stops calculating the d-axis current estimated value id_set, and the q-axis current estimated value iq_est, and the monitor phase current estimated value iv_est in the two-phase control mode. Similarly, the control phase current estimation part 41 stops calculating the control phase current estimated value iw_est in the two-phase control mode.

In other words, in the present embodiment, at the time of the one-phase control mode in which the number of revolutions N is larger than the determination value X and in which the one-phase control is performed and in which an abnormality of the control phase current sensor 12 and the monitor phase current sensor 13 is detected, the d-axis current estimated value id_est and the q-axis current estimated value iq_est and the monitor phase current estimated values iv_est and the control phase current estimated value iw_est are calculated, whereas the d-axis current value id and the q-axis current value iq, which are used for the two-phase control, are not calculated. On the other hand, at the time of the two-phase control mode in which the number of revolutions N is not larger than the determination value X and in which the two-phase control is performed, the d-axis current value id and the q-axis current value iq are calculated, whereas the d-axis current estimated value id_est and the q-axis current estimated value iq_est, the monitor phase current estimated value iv_est, and the control phase current estimated value iw_est, which are used for the one-phase control and for detecting an abnormality of the control phase current sensor 12 and the monitor phase current sensor 13, are not calculated.

In this way, as compared with the case where the d-axis current estimated value id_est and the q-axis current estimated value iq_est, the monitor phase current estimated value iv_est, the control phase current estimated value iw_est, and the d-axis current value id and the q-axis current value iq are constantly calculated, a calculation load can be reduced and hence resources can be saved.

Further, the same effects as the embodiment described above can be produced.

Figure 12:
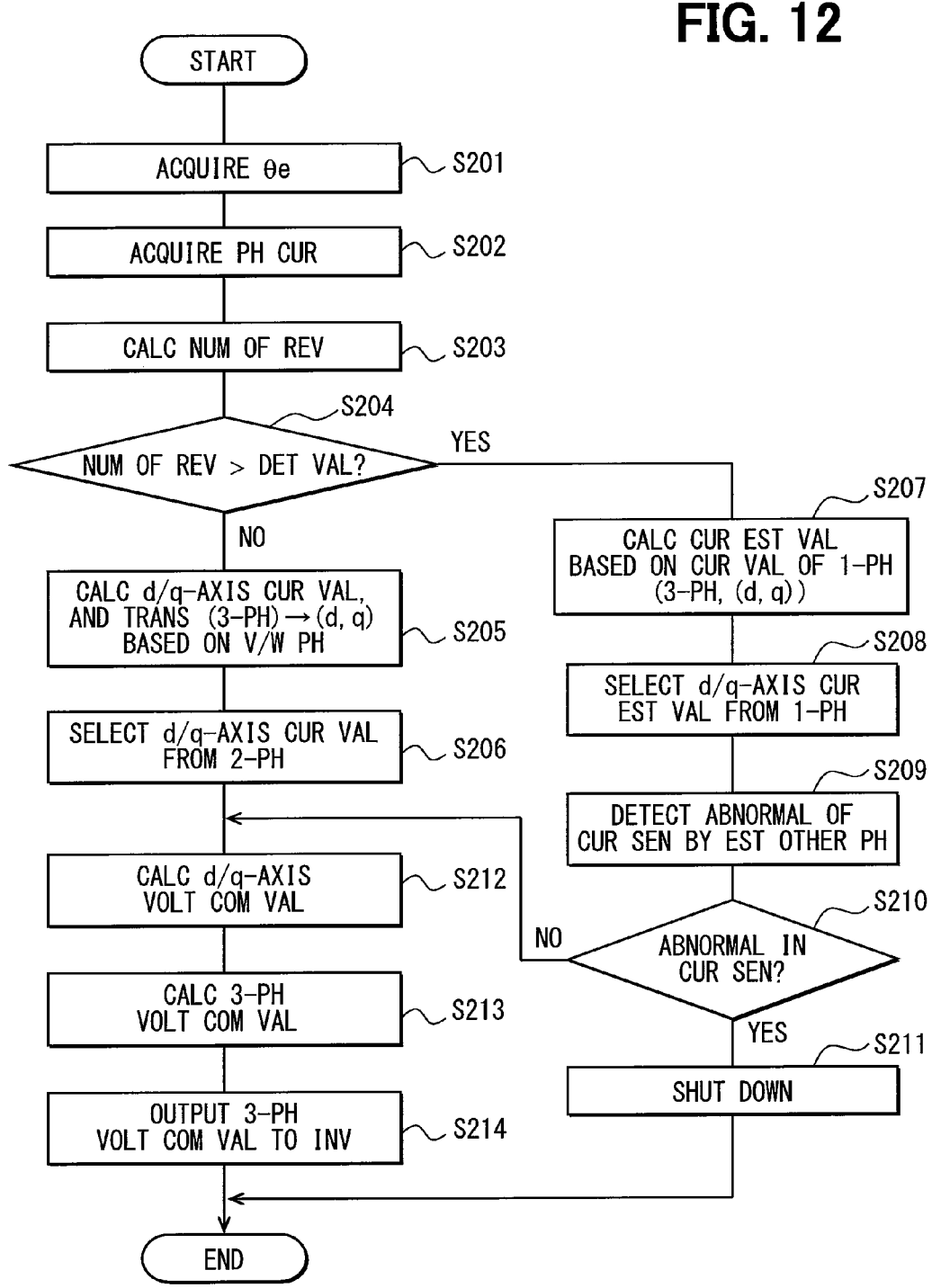
FIG. 12 is a flow chart to show current feedback control processing of the second embodiment of the present disclosure.

In the present embodiment, S202 shown in FIG. 12 corresponds to processing as the function of "the control phase current acquisition means" and "the monitor phase current acquisition means", S201 corresponds to processing as the function of the "rotation angle acquisition means", S205 corresponds to processing as the function of "the current calculation means", S207 corresponds to processing as the functions of "the current estimation means" and "the other phase current estimation means", S212 corresponds to processing as the function of "the voltage command value calculation means", S209 corresponds to processing of the function of "the abnormality detection means", and S206 and S208 correspond to processing of the function of "the switching means".

(Third Embodiment)

A third embodiment is a modified example of the second embodiment. Current feedback processing according to the third embodiment will be described on the basis of FIG. 13.

As described in the first embodiment, the current estimation part 32 performs the calculation of the filtering system, so that the d-axis current estimated value id_est and the q-axis current estimated value iq_est after the start of the calculation do not always agree with the actual d-axis current value id and the actual q-axis current value iq. For this reason, in the present embodiment, the calculation of the d-axis current estimated value id_est and the q-axis current estimated value iq_est is started at a given timing before a timing when the two-phase control is switched to the one-phase control.

Figure 13:
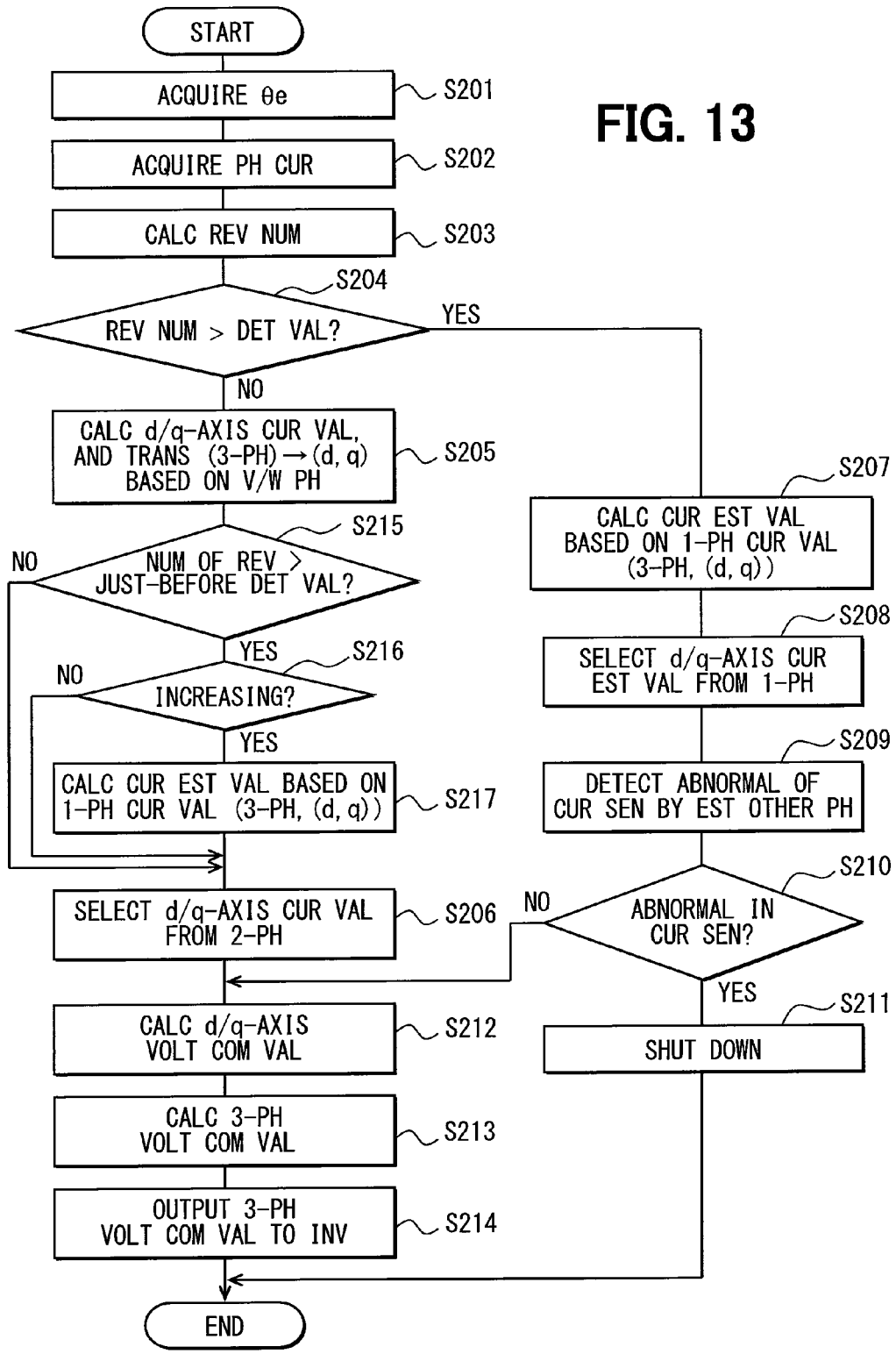
FIG. 13 is a flow chart to show current feedback control processing of a third embodiment of the present disclosure.

Current feedback processing of the present embodiment shown in FIG. 13 is different from the current feedback control of the second embodiment shown in FIG. 12 in that S215 to S217 are added between S205 and S206. Here, this different point will be mainly described and the descriptions of the other constructions will be omitted.

In S215 to which the procedure proceeds after S205, it is determined whether or not the number of revolutions N is larger than a just-before determination value Y. The just-before determination value Y is smaller than the determination value X and, for example, if the determination value X is 1500 rpm, the just-before determination value Y is 1400 rpm. The I just-before determination value Y is set according to the period of time which is required for the d-axis current estimated value id_est and the q-axis current estimated value iq-current estimated value to be asymptotic to the d-axis current value id and the q-axis current value iq, respectively, to thereby make an estimation accuracy increase. That is, the just-before determination value Y is set in such a way that the estimation accuracy of the d-axis current estimated value id_est and the q-axis current estimated value iq_est is increased before the number of revolutions N reaches the determination value X from the just-before determination value Y.

If it is determined that the number of revolutions N is not larger than the just-before determination value Y (S215: NO), processing in S217 is not performed but the procedure proceeds to S206. If it is determined that the number of revolutions N is larger than the just-before determination value Y (S215: YES), the procedure proceeds to S216.

In S216, it is determined whether the direction of change of the number of revolutions N is an increasing direction or a decreasing direction. When the direction of change of the number of revolutions N is the increasing direction, the state where the number of revolutions N is smaller than the just-before determination value Y is being changed to the state where the number of revolutions N is larger than the just-before determination value Y. It is assumed that when the direction of change of the number of revolutions N is the increasing direction, the number of revolutions N becomes larger than the determination value X and the two-phase control mode of the two-phase control is just before switching to the one-phase control mode in which an abnormality of the control phase current sensor 12 and the monitor phase current sensor 13 is detected in the one-phase control. On the other hand, when the direction of change of the number of revolutions N is the decreasing direction, the state where the number of revolutions N is larger than the determination value X is being changed to the state where the number of revolutions N is not larger than the determination value X. It is assumed that when the direction of change of the number of revolutions N is the decreasing direction, the one-phase control mode, in which the abnormality of the control phase current sensor 12 and the monitor phase current sensor 13 is detected in the one-phase control, is just after having switched to the two-phase control mode and the two-phase control mode is not just before switching to the one-phase control mode. Here, it is assumed that a small change in the number of revolutions N is not questioned.

If it is determined that the direction of change of the number of revolutions N is not the increasing direction (S216: NO), that is, if the direction of change of the number of revolutions N is the decreasing direction and the two-phase control mode is not just before switching to the one-phase control mode, processing of S217 is not performed but the procedure proceeds to S206. If it is determined that the direction of change of the number of revolutions N is the increasing direction (S216: YES), that is, if the two-phase control mode is just before switching to the one-phase control mode, the procedure proceeds to S217.

The processing in S217 is the same as the processing in S104 shown in FIG. 9, and the current estimation part 32 calculates the d-axis current estimated value id_est and the q-axis current estimated value iq_est and the monitor phase current estimated value iv_est, and the control phase current estimation part 41 calculates the control phase current estimated value iw_est. In this regard, within a range in which the number of revolutions N is larger than the last determination value Y and is not larger than the determination value Y, the calculation of the d-axis current estimated value id_est and the q-axis current estimated value iq_est and the like is started, but the current fed back to the PI calculation part 22 from the current selection part 35 is made the d-axis current value id and the q-axis current value iq and the two-phase control is performed.

In the present embodiment, the number-of-revolutions determination part 52 determines whether or not the two-phase control mode is just before switching to the one-phase control mode (S215, S216). The two-phase control current calculation part 31 stops calculating the d-axis current value id and the q-axis current value iq in the one-phase control mode in which the number of revolutions N is larger than the determination value X.

Further, if it is determined in the two-phase control mode that the two-phase control mode is not just before switching to the one-phase control mode (S215: NO or S216: NO), the current estimation part 32 stops calculating the d-axis current estimated value id_est and the q-axis current estimated value iq_est and the monitor phase current estimated value iv_est, and the control phase current estimation part 41 stops calculating the control phase current estimated value iw_est. On the other hand, if it is determined in the two-phase control mode that the two-phase control mode is just before switching to the one-phase control mode (S215: YES and S216: YES), the current estimation part 32 calculates the d-axis current estimated value id_est and the q-axis current estimated value iq_est and the monitor phase current estimated value iv_est and the control phase current estimation part 41 calculates the control phase current estimated value iw_est.

In this way, when the two-phase control mode switches to the one-phase control mode, that is, when the two-phase control switches to the one-phase control, the error between the d-axis current estimated value id_est and the d-axis current value id and the error between the q-axis current estimated value iq_est and the q-axis current value iq can be made smaller. Therefore, when the two-phase control switches to the one-phase control, it is possible to prevent the control of the AC motor 2 from being made unstable by the error between the d-axis current estimated value id_est and the d-axis current value id and the error between the q-axis current estimated value iq_est and the q-axis current value iq.

Further, as compared with the case where the d-axis current estimated value id_est and the q-axis current estimated value iq_est, the monitor phase current estimated value iv_est, the control phase current estimated value iw_est, and the d-axis current value id and the q-axis current value iq are constantly calculated, a calculation load can be reduced and the resources can be saved.

Still further, the same effects as the embodiments described above can be produced.

In the present embodiment, the number-of-revolutions determination part 52 of the control section 15 constructs "a just-before switching determination means". Further, S215 and S216 correspond to processing as the function of "the just-before switching determination means"

(Fourth Embodiment)

A fourth embodiment is different from the first embodiment only in the calculation method in the current estimation part 32, and hence this point will be mainly described and the descriptions of the other constructions will be omitted.

In the first embodiment, by integrating the correction vector (Δid, Δiq) in the control phase direction, the convergence of the d-axis current estimated value id_est to the d-axis current value id and the convergence of the q-axis current estimated value iq_est to the q-axis current value iq are enhanced. In other words, in the respective embodiments described above, the d-axis current estimated value id_est and the q-axis current estimated value iq_est are corrected in the control phase direction. In the present embodiment, in order to enhance the convergence of the d-axis current estimated value id_est to the d-axis current value id and the convergence of the q-axis current estimated value iq_est to the q-axis current value iq, the d-axis current estimated value id_est and the q-axis current estimated value iq_est are corrected also in a direction perpendicular to the control phase direction.

Figure 14:
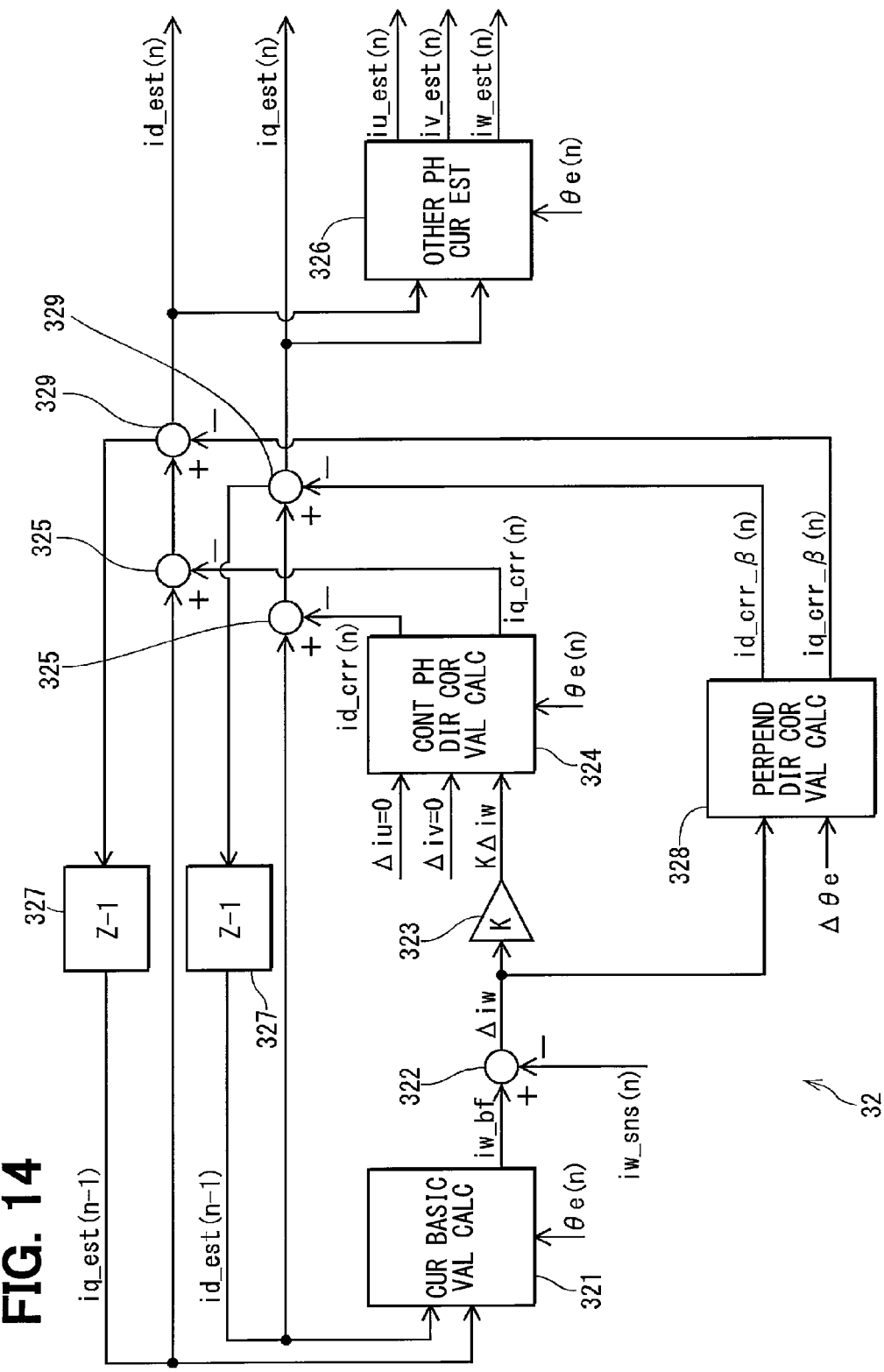
FIG. 14 is a block diagram to show a construction of a current estimation part according to a fourth embodiment of the present disclosure.
Figure 15:
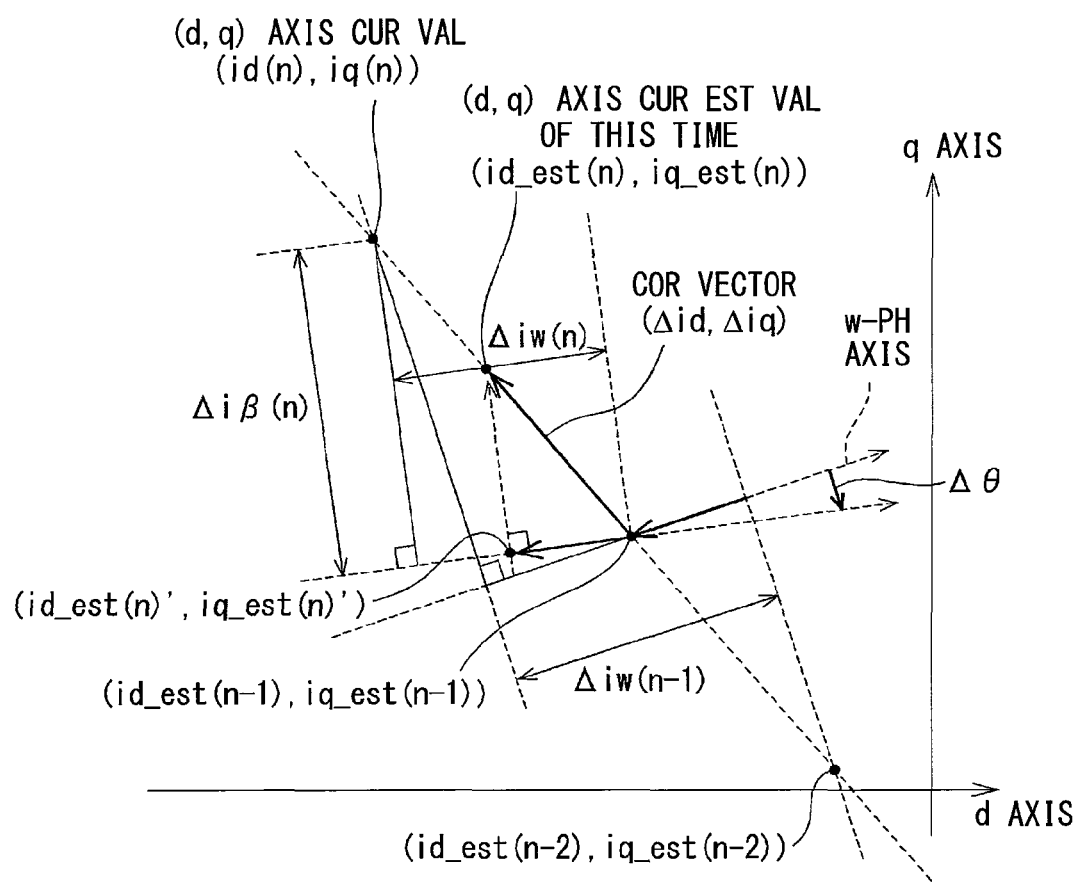
FIG. 15 is an illustration to illustrate a current estimation according to the fourth embodiment of the present disclosure.

In more detail, as shown in FIG. 14, the current estimation part 32 further has a perpendicular direction correction value calculation part 328. An asymptotic equation expressing calculation in the current estimation part 32 of the present embodiment is expressed by an equation (6). When the asymptotic equation shown by the equation (6) is expressed by a vector diagram, the vector diagram shown in FIG. 15 is acquired.

[Mathematical formula 4]

$$\begin{bmatrix} id\_est(n) \\ iq\_est(n) \end{bmatrix} = \begin{bmatrix} id\_est(n-1) \\ iq\_est(n-1) \end{bmatrix} - K \begin{bmatrix} \cos(\theta w(n)) \\ -\sin(\theta w(n)) \end{bmatrix} \Delta iw - \begin{bmatrix} id\_crr\_\beta(n) \\ iq\_crr\_\beta(n) \end{bmatrix} \quad (6)$$

$$\Delta i\beta = \frac{\cos\Delta\theta e}{\sin\Delta\theta e} \left\{ \Delta iw(n) - \frac{1}{\cos\Delta\theta e}(1-K)\Delta iw(n-1) \right\} \quad (7)$$

$$\begin{bmatrix} id\_crr\_\beta(n) \\ iq\_crr\_\beta(n) \end{bmatrix} = K \begin{bmatrix} \cos(\theta w(n)+90°) \\ -\sin(\theta w(n)+90°) \end{bmatrix} \Delta i\beta \quad (8)$$

In the present embodiment, the control phase direction correction value calculation part 324 calculates the control phase direction correction values id_crr (n), iq_crr (n), and the subtractor 325 subtracts the control phase direction correction value id_crr (n) from the last d-axis current estimated value id_est (n−1) and subtracts the control phase direction correction value iq_crr (n) from the last q-axis current estimated value iq_est (n−1) to thereby calculates a d-axis current provisional estimated value id_est' (n) and a q-axis current provisional estimated value iq_est' (n), respectively. The d-axis current provisional estimated value id_est' (n) and the q-axis current provisional estimated value iq_est' (n) are the same as the d-axis current estimated value id_est (n) and a q-axis current estimated value iq_est (n) of the first embodiment.

The perpendicular direction correction value calculation part 328 estimates a β-axis estimated error Δiβ of a component perpendicular to the control phase on the basis of an equation (7). Further, the perpendicular direction correction value calculation part 328 calculates a perpendicular direction correction values id_crr_β (n) and iq_crr_β (n) by the dq transformation by the use of the β-axis estimated error Δiβ (see an equation (8)).

The subtractor 329 subtracts the calculated perpendicular direction correction value id_crr_β (n) from the d-axis current provisional estimated value id_est' (n) and subtracts the calculated perpendicular direction correction values iq_crr_β (n) from the q-axis current provisional estimated value iq_est' (n) to thereby calculate the d-axis current estimated value id_est and the q-axis current estimated value iq_est, respectively (see equation (6)).

In the present embodiment, the current estimation part 32 calculates the d-axis current estimated value id_est and the q-axis current estimated value iq_est by integrating the control phase direction correction values id_crr (n), iq_crr (n) and the perpendicular direction correction values id_crr_β (n), iq_crr_β (n), which are calculated on the basis of the current basic value iw_bf and the control phase current sensed value iw_sns which are control phase components of the d-axis current estimated value id_est and the q-axis current estimated value iq_est which are calculated in the last calculation. In more detail, in the present embodiment, the current estimation part 32 integrates the correction vector (Δid,Δiq) on the (d,q) axis plane, the correction vector (Δid,Δiq) being composed of the control phase direction correction values id_crr (n), iq_crr (n) and the perpendicular direction correction values id_crr_β (n), iq_crr_β (n) which are perpendicular to the control phase direction.

In this method, the d-axis current estimated value id_est and the q-axis current estimated value iq_est can be corrected also in the direction perpendicular to the control phase direction. However, the amount of correction in the direction perpendicular to the control phase direction is calculated from the amount of change in the electric angle and hence an accuracy is likely to become worse in the range in which the number of revolutions is low, so that the two-phase control is performed in the range in which the number of revolutions is low.

In this way, by the use of the control phase direction correction values id_crr (n), iq_crr (n) rotating with the rotation of the AC motor 2 and the perpendicular direction correction values id_crr_β (n), iq_crr_β (n), the d-axis current estimated value id_est and the q-axis current estimated value iq_est can be calculated with high accuracy. Further, the same effects as the embodiments described above can be produced.

The current estimation method of the fourth embodiment may be used as the current estimation method of any one of the first to the third embodiments.

In the present embodiment, the correction vector (Δid,Δiq) composed of the control phase direction correction values id_crr (n), iq_crr (n) and the perpendicular direction correction values id_crr_β (n), iq_crr_β (n) corresponds to "the correction vector". Further, subtracting the control phase direction correction values id_crr (n), iq_crr (n) and the perpendicular direction correction values id_crr_β (n), iq_crr_β (n) from the d-axis current estimated value id_est (n−1) and the q-axis current estimated value iq_est (n−1) in terms of vector by the use of the subtractors 325, 329 corresponds to "integrating the correction vector on the (d,q) axis plane".

(Fifth Embodiment)

A fifth embodiment and a sixth embodiment are different from the embodiments described above only in a calculation method in the current estimation part 32, so that this point will be mainly described and the descriptions of the other constructions will be omitted.

In the embodiments described above, the d-axis current estimated value id_est and the q-axis current estimated value iq_est are calculated by integrating the correction vector (Δid, Δiq). In the fifth embodiment, the d-axis current estimated value id_est and the q-axis current estimated value iq_est are calculated by the use of the d-axis current command value id* and the q-axis current command value iq*.

In the present embodiment, the control phase current sensed value iw_sns is used as the W-phase current of the equation (1). Further, a U-phase current command value iu* and a V-phase current command value iv*, which are three-phase current command values calculated from the inverse dq transformation of the d-axis current command value id* and the q-axis current command value iq*, are used as an U-phase current iu and a V-phase current iv. Further, it is also recommended to employ a method of using one of the U-phase current command value iu* and the V-phase current command value iv* and of keeping that the sum of three-phase current command values=0.

Figure 16A:
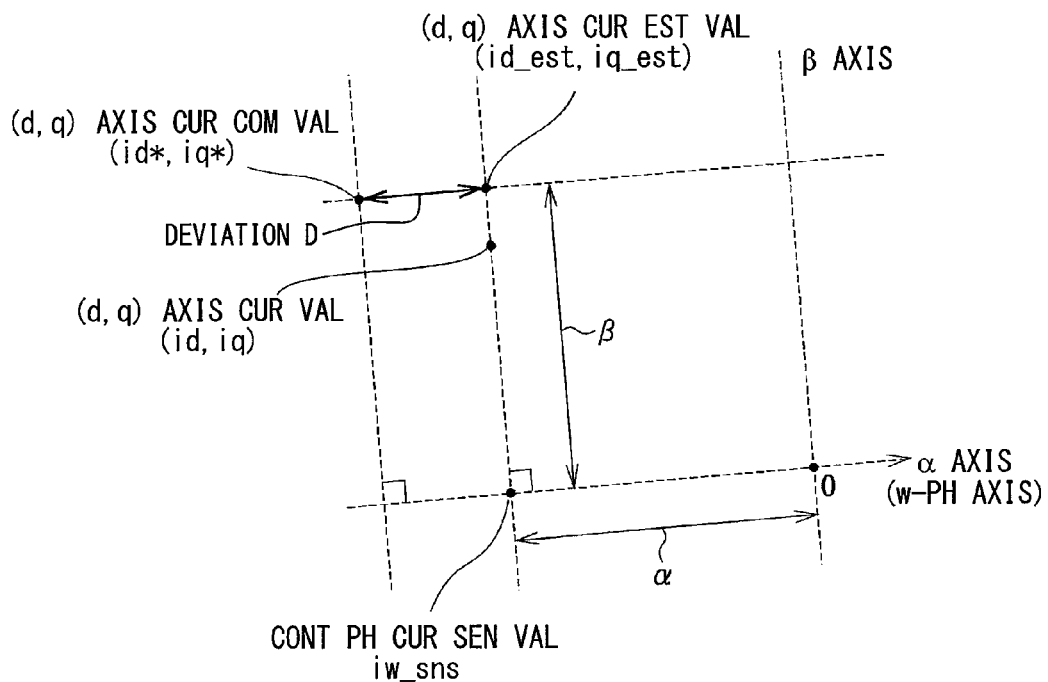
FIGS. 16A and 16B are illustrations to illustrate a current estimation method according to a fifth embodiment of the present disclosure.

A current estimation method using the d-axis current command value id* and the q-axis current command value iq* will be described on the basis of FIGS. 16A and 16B. FIG. 16A shows a coordinate system having a W-phase axis of the control phase as an α axis and having a direction perpendicular to the W-phase axis as a β axis, and this (α,β) axis coordinate system rotates relatively in the (d,q) axis coordinate system (not shown) of a rotating coordinate system. Here, the d-axis current estimated value id_est and the q-axis current estimated value iq_est are calculated in terms of vector from the control phase current sensed value iw_sns and the U-phase current command value iu* and the V-phase current command value iv*, to which the d-axis current command value id* and the q-axis current command value iq* are transformed by the inverse dq transformation. The deviation D between the calculated (d,q) axis current command value (id*, iq*) and the (d,q) axis current estimated value (id_est, iq_est), which is calculated in terms of vector, is surely in the control phase direction (in a W-axis direction in this example). Hence, in the PI calculation in the PI calculation part 22 shown in FIG. 3, a voltage operation is performed on the basis of an actual control phase current sensed value iw_sns, so that the voltage operation is performed only in the W-phase axis direction of high reliability and is not performed in the other directions of comparatively low reliability (U-phase direction and V-phase direction). Therefore, it is possible to prevent an abnormal voltage from being outputted because of an estimated error of the current estimated value and hence to perform a safe operation.

Figure 16B:
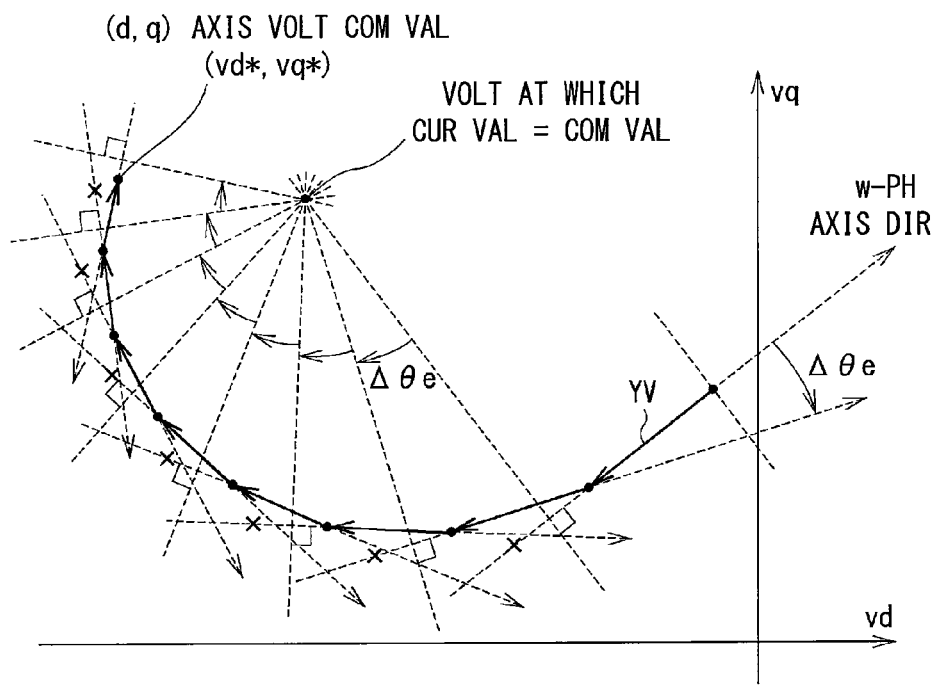

Thus, as shown in FIG. 16B, by the use of the W-phase axis, shown by broken arrows, relatively rotating along with the rotation of the AC motor 2 on the (d,q) axis plane of the rotating coordinate system, the voltage command values vd*, vq* are made asymptotic to voltages required for the d-axis current estimated value id_est and the q-axis current estimated value iq_est to be equal to the d-axis current command value id* and the q-axis current command value iq*. Hence, if the angular movement Δθe of each sensor cycle (for example, 100 μsec) is larger than a given value, in other words, the number of revolutions N is the given determination value X or more, the voltage command values vd*, vq* are asymptotic to desired values, so that the AC motor 2 can be controlled with high accuracy.

In this regard, in FIG. 16B, the arrows YV show the movement of a first term of the voltage command values vd*, vq* calculated by the PI calculation. Further, a reference symbol "X" shows the voltage command values vd*, vq* including also a P term.

(Sixth Embodiment)

In a sixth embodiment, a control phase basic current phase φ is calculated by the use of the d-axis current command value id* and the q-axis current command value iq*, and the d-axis current estimated value id_est and the q-axis current estimated value iq_est are calculated on the basis of the calculated control phase basic current phase φ.

Figure 17:
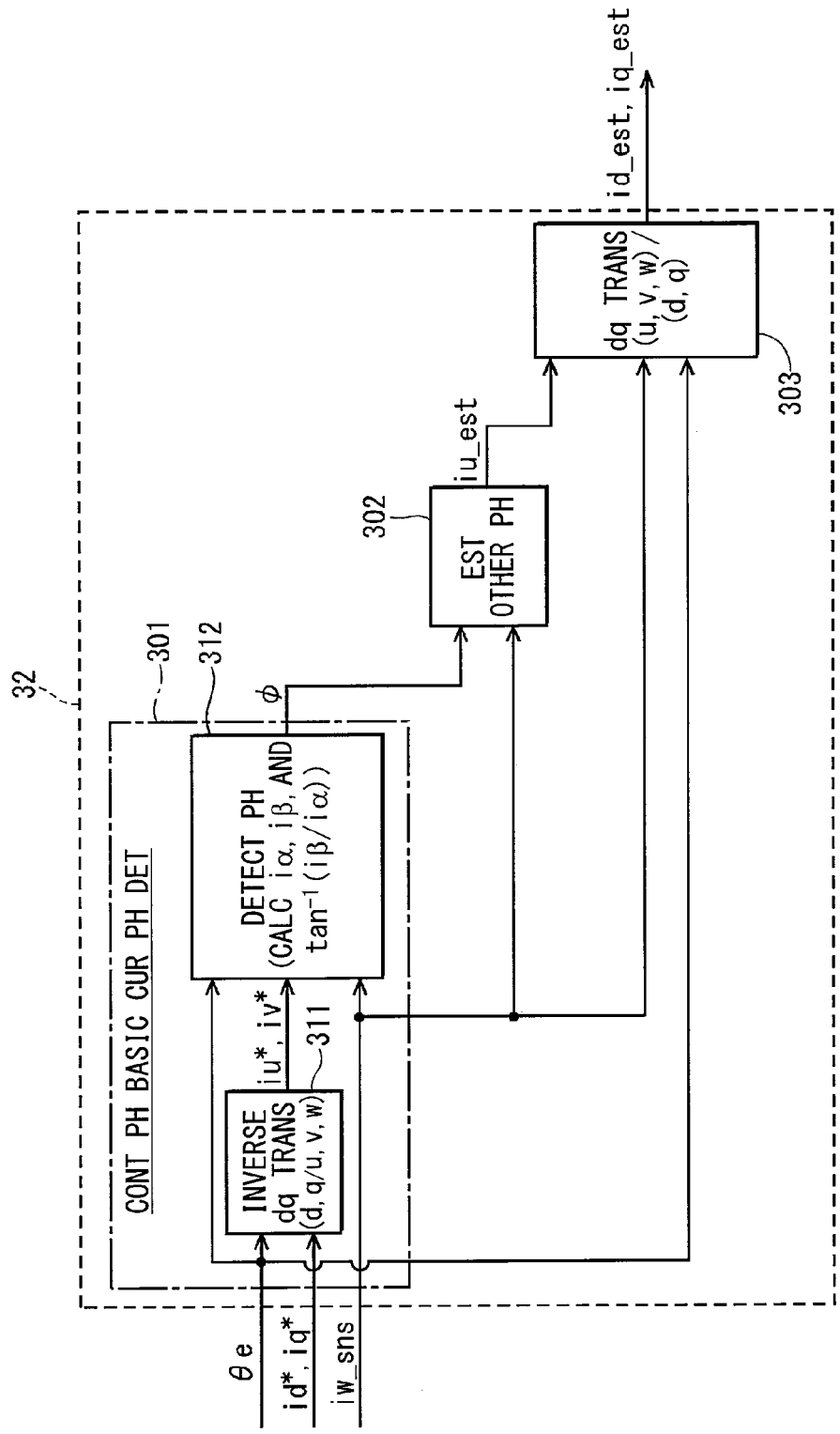
FIG. 17 is a block diagram to show a construction of a current estimation part according to a sixth embodiment of the present disclosure.

As shown in FIG. 17, the current estimation part 32 has a control phase basic current phase detection part 301, an other phase estimation part 302, and a dq transformation part 303.

The control phase basic current phase detection part 301 has an inverse dq transformation part 311 and a phase detection part 312.

First, the inverse dq transformation part 311 inversely dq-transforms the d-axis current command value id* and the q-axis current command value iq* by the use of the electric angle θe to thereby calculate the U-phase current command value iu* and the V-phase current command value iv*.

The phase detection part 312 calculates a control phase basic current phase φ on the basis of the V-phase current command value iv*, which is calculated by the inverse dq transformation part 311, and the control phase current sensed value iw_sns. Here, when the W-phase axis of the control phase is made an a axis and a direction perpendicular to the α axis is made a β axis, an α-axis current iα and a β-axis current iβ are expressed by equations (9), (10).

[Mathematical formula 5]

$$i\alpha = K \times \frac{3}{2} \times \text{iw\_sns} \quad (9)$$

$$i\beta = K \times \left(\frac{\sqrt{3}}{2} \times iu^* - \frac{\sqrt{3}}{2} iv^*\right) \quad (10)$$

Here, the equation (10) may be modified by the use of the Kirchhoff's law in such a way as to include the control phase current sensed value iw_sns so as to include a component of the W phase of the control phase. When the equation (10) includes the component of the W phase of the control phase, the estimation accuracy can be enhanced.

The control phase basic current phase φ is expressed by the following equation (11) using the α-axis current iα and the β-axis current iβ.

[Mathematical formula 6]

$$\phi = \tan^{-1}\left(\frac{i\beta}{i\alpha}\right) \quad (11)$$

The other phase estimation part 302 calculates an estimated phase current estimated value iu_est on the basis of the control phase basic current phase φ, which is calculated by the phase detection part 312, and the control phase current sensed value iw_sns (see equation (12)). In this regard, Ia in the equation (12) is an amplitude but is not required to be calculated because Ia is a coefficient that is not finally included.

[Mathematical formula 7]

$$\begin{aligned}
\text{iu\_est} &= Ia \times \sin(\phi - 120°) \quad (12)\\
&= -\frac{1}{2} \times Ia \times \sin(\phi) - \frac{\sqrt{3}}{2} \times Ia \times \cos(\phi)\\
&= -\frac{1}{2} \times \text{iw\_sns} - \frac{\sqrt{3}}{2} \times \frac{Ia \times \sin(\phi)}{\tan(\phi)}\\
&= \left\{-\frac{1}{2} - \frac{\sqrt{3}}{2} \times \frac{1}{\tan(\phi)}\right\} \times \text{iw\_sns}
\end{aligned}$$

The dq transformation part 303 calculates the d-axis current estimated value id_est and the q-axis current estimated value iq_est by the dq transformation on the basis of the estimated phase current estimated value iu_est, the control phase current sensed value iw_sns, and the electric angle θe.

Here, when the control phase current sensed value iw_sns becomes 0 A, or the tangent tan(φ) of the control phase basic current phase φ reaches an infinite value, the calculation of "multiplying a number by 0" is caused in the equation (12). Further, when the tangent tan(φ) of the control phase basic current phase φ becomes 0, the calculation of "dividing a number by 0" is caused in the equation (12). For this reason, the estimated phase current estimated value iu_est is likely to be varied. Hence, within a zero cross range, zero cross correction processing of masking the calculation of "multiplying a number by 0" and "dividing a number by 0" may be performed. As the zero cross correction processing, for example, a d-axis current deviation and a q-axis current deviation are forcibly made 0 A, whereby the d-axis voltage command value vd* and the q-axis voltage command value vq* are fixed. Alternatively, the d-axis voltage command value vd* and the q-axis voltage command value vq* may be held at the last values, thereby being directly fixed.

Even in the case where the d-axis current estimated value id_est and the q-axis current estimated value iq_est are calculated in this way by the use of the control phase basic current phase φ, similarly to the fifth embodiment, as shown in FIG. 16B, the voltage command values vd*, vq* are asymptotic to desired values, so that the AC motor 2 can be controlled with high accuracy.

Here, an example has been described in which the U-phase current is estimated, but the method of calculating a monitor phase current estimated value iv_est from the control phase current sensed value iw_sns is the same. Further, the same calculation is performed also in the control phase current estimation part 41, and the method of estimating the U-phase current or the W-phase current (control phase current estimated value iw_est) by the use of monitor phase current sensed value iv_sns is performed in the same way, so that the description will be omitted.

In the present embodiment, the monitor phase current estimated value iv_est is calculated on the basis of the current command values id*, iq* in addition to the control phase current sensed value iw_sns and the electric angle θe. Further, the control phase current estimated value iw_est is calculated on the basis of the current command values id*, iq* in addition to the monitor phase current sensed value iv_sns and the electric angle θe.

Further, in the fifth embodiment and the sixth embodiment, the current estimation part 32 calculates the d-axis current estimated value id_est and the q-axis current estimated value iq_est on the basis the d-axis current command value id* and the q-axis current command value iq*, the control phase current sensed value iw_sns, and the electric angle θe, which are related to the drive of the AC motor 2. Further, the PI calculation part 22 calculates the voltage command values vd*, vq* by which the (d,q) axis current estimated value (id_est, iq_est) is made equal to the (d,q) axis current command value (id*,iq*) in terms of vector by integrating the deviation D between the (d,q) axis current command value (id*,iq*) and the (d,q) axis current estimated value (id_est, iq_est), which is in the control phase (W phase in the present embodiment) rotating the (d,q) axis plane of the rotating coordinate system, in terms of vector.

In the fifth embodiment and the sixth embodiment, when the currents are estimated on the basis of the control phase current sensed value iw_sns and the electric angle θe, the d-axis current estimated value id_est and the q-axis current estimated value iq_est can be calculated with high accuracy on the basis of the d-axis current command value id* and the q-axis current command value iq*. In this way, also in the fifth embodiment and the sixth embodiment, the same effects as the embodiments described above can be produced.

In this regard, in the fifth embodiment and the sixth embodiment, the d-axis current command value id* and the q-axis current command value iq* correspond to the "current command value".

The current estimation method in the fifth embodiment and the sixth embodiment may be the current estimation method in any one of the first to the third embodiments.

(Other Embodiments)

(A) The one-phase control current estimated value may be calculated by any current estimation method, if the current estimation method is a method of integrating the correction vector or a method of using the current command value.

Further, the description has been made on the assumption that the calculation method in the control phase current estimation part is the same as the calculation method in the current estimation part. However, in the other embodiments, the calculation method in the control phase current estimation part may be different from the calculation method in the current estimation part.

(B) In the other embodiments, initial values in the calculation of the one-phase control current estimated value may be the last d-axis current value id and the last q-axis current value iq. In this way, when the two-phase control is changed to the one-phase control, the error between the d-axis current estimated value id_est and the d-axis current value id and the error between the q-axis current estimated value iq_est and the q-axis current value iq can be reduced, which hence can prevent the control of the AC motor 2 from being made unstable because of the errors.

(C) In the embodiments described above, the rotation angle sensor senses the electric angle θe and outputs the electric angle θe to the control section. In the other embodiments, the rotation angle sensor may sense a mechanical angle θm and may output the mechanical angle θm to the control section and the mechanical angle θm may be converted into the electric angle θe in the control section. Further, in place of the electric angle θe, the mechanical angle θm may be made "the rotation angle sensed value". Still further, the number of revolutions N may be calculated on the basis of the mechanical angle θm.

(D) In the embodiments described above, whether or not the AC motor is driven within a low rotation range is determined on the basis of the number of revolutions N. In the other embodiments, whether or not the AC motor is driven within a low rotation range may be determined on the basis of an electric frequency in place of the number of revolutions N. For example, in the case where the number of poles of the AC motor is four, the number of revolutions 1500 rpm of the determination value shown by an example in the embodiments described above correspond to an electric frequency of 100 Hz and hence whether or not the AC motor is driven within a low rotation range may be determined on the basis of the electric frequency.

(E) In the third embodiment described above, in the case where the number of revolutions N is larger than the last determination value Y and is not larger than the determination value X and the direction of a change of the number of revolutions N is the increasing direction, it is determined that the two-phase control mode is just before switching to the one-phase control mode. In the other embodiments, even in the state where the number of revolutions N is decreasing, in the case where the number of revolutions N is larger than the just-before determination value Y and is not larger than the determination value X, in consideration of the possibility of immediately returning to the one-phase control, regardless of the direction of change of the number of revolutions N, in the case where the number of revolutions N is larger than the just-before determination value Y and is not larger than the determination value X, it may be determined that the two-phase control is just before switching to the one-phase control. That is, the determination processing of S216 shown in FIG. 13 may be omitted.

(F) In the embodiments described above, the abnormality of the control phase current sensor and the monitor phase current sensor is detected on the basis of the control phase difference reference value $\Delta iw\_ref$ and the monitor phase difference reference value $\Delta iv\_ref$, the control phase difference reference value $\Delta iw\_ref$ being acquired by comparing the control phase current estimated value iw_est with the control phase current sensed value iw_sns by the control phase current comparison part, the monitor phase difference reference value $\Delta iv\_ref$ being acquired by comparing the monitor phase current estimated value iv_est with the monitor phase current sensed value iv_sns by the monitor phase current comparison part.

In the other embodiments, the monitor phase current comparison part may be omitted and the abnormality of the current sensor may be detected on the basis of only the control phase difference reference value $\Delta iw\_ref$ acquired by the control phase current comparison part. The calculation result of the control phase current estimation part for calculating the control phase current estimated value iw_est used by the control phase comparison part is not used for the current feedback control and hence is not affected by the interference of the current feedback control. Therefore, the abnormality of the control phase current sensor and the monitor phase current sensor can be adequately detected.

Further, in the other embodiments, the control phase current estimation part and the control phase current comparison part may be omitted and the abnormality of the control phase current sensor and the monitor phase current sensor may be detected on the basis of only the monitor phase difference reference value $\Delta iv\_ref$ by the monitor phase current comparison part. In this way, the amount of calculation relating to the detection of the abnormality of the control phase current sensor and the monitor phase current sensor can be reduced.

(G) In the embodiments described above, the examples have been described in which the current sensors are disposed for two phases of three phases. In the other embodiments, in the case where the current sensors are disposed for three phases and where an abnormality is caused in any one phase and where the control is performed in two phases in which an abnormality is not caused, the above-mentioned feedback processing may be performed. In that case, it is only necessary that one phase of the two phases in which the abnormality is not caused is assumed to be the control phase and that the other phase is assumed to be the monitor phase. Here, the method of detecting an abnormality caused in one phase of the three phases and the method of specifying a phase in which an abnormality is caused may be any method.

(H) The inverter for controlling the voltage to be impressed on the AC motor may be controlled by any method, if the method can perform the current feedback control. For example, the inverter can be so constructed as to be controlled by adequately switching a sine wave PWM control mode, an over-modulated PWM control mode, and a square wave control mode. Here, in some cases, the square wave control mode is a mode of torque feedback control in which only the phase of voltage can be controlled, but the torque to be fed back can be estimated from the current and hence can be considered as "the current feedback control" in the broad sense of the term.

(I) In the embodiments described above, the two-phase control current values are assumed to be the d-axis current value id and the q-axis current value iq and the one-phase current estimated values for controlling are assumed to be the d-axis current estimated value id_est and the q-axis current estimated value iq_est. In the other embodiments, the two-phase control current values and the one-phase current estimated value for controlling may be the respective phase currents and the current values based on the other axes, if they are current values to be used for the current feedback control. Here, "one-phase current estimated values for controlling" show the current estimated values estimated from the current sensed value of one phase so as to be used for the current feedback control. Further, "one-phase current estimated value for monitoring" shows the current estimated value estimated from the current sensed value of one phase so as to detect the abnormality of the current sensor.

(J) In the embodiments described above, the AC motor is a three-phase permanent magnet synchronous motor, but in the other embodiments, an induction motor or the other synchronous motor may be used for the AC motor. Further, the AC motor in the embodiment described above is a so-called motor generator having both of a function as an electric motor and a function as a generator, but in the other embodiments, the AC motor may be an electric motor not having the function as the generator.

The AC motor may be constructed in such a way as to operate as the electric motor for the engine and to start the engine. Further, the engine may be not disposed. Still further, a plurality of AC motors may be disposed and a power dividing mechanism for dividing power in the plurality of AC motors may be further disposed.

(K) The control device of an AC motor according to the present disclosure may be applied not only to a system having one set of inverter and AC motor, as described in the embodiments, but also to a system having two or more sets of inverter and AC motor. Further, the control device of an AC motor according to the present disclosure may be applied to a system of an electric train having a plurality of AC motors connected in parallel to one inverter.

Still further, the control device of an AC motor is applied to the electric vehicle but may be applied to an object other than the electric vehicle.

Finally, the problems of the present application will be summarized.

For example, in a system in which a motor needs to be controlled at high speed and high accuracy, as is the case of the main motor of the hybrid vehicle and the electric vehicle, in order to perform a vector control with high accuracy by the use of current sensed values of only one phase, the following technique is required.

For example, there is proposed a current estimation method shown in the following: by using a component of a current sensed value of one phase, which is originally a fixed coordinate system, relatively rotating in the (d,q) coordinate system of a rotating coordinate system, corrections based on the current sensed values are accumulated (integrated) for the current estimated value, whereby a correction direction is apparently gradually rotating in the (d,q) coordinate system; and hence the current estimated values are asymptotic to and finally become equal to an actual current vector of one point on the two-dimensional (d,q) coordinate system. According to the current estimation method like this, one point of the actual current vector on the two-dimensional coordinate system can be correctly estimated, so that even if the vector control is performed at high speed and with high accuracy, it is possible to prevent the performance of the vector control from being impaired as compared with the case where the vector control is performed on the basis of the current sensed values of two phases.

Further, for example, there is proposed a method for calculating current values of remaining two phases other than the current sensed value of only one phase on the basis of current command values. According to this method, in the current feedback control in which PI control calculation is performed on the basis of the deviation between the current sensed value and the current command value to thereby calculate a voltage command, because a component of a part of the current estimated value to be fed back is calculated from the current command value, the deviation between the component and the current command value is not caused. The component calculated from the current command value is a component independent of the current sensed value. Hence, it is possible to prevent a false voltage command calculation that can be performed in the case where a current estimated value of low accuracy is fed back, as is the case of the patent documents 1, 2. In addition, like the above-mentioned method, the component of the one phase rotates relatively in the (d,q) coordinate system, so that when a voltage operation is integrated to the integrated value of the PI control in terms of vector, the current deviation between the current estimated value and the current command value becomes zero in terms of vector in due course and hence the voltage command value converges in terms of vector on voltage at one point on the (d,q) coordinate system, the one point being a point at which the current sensed value is equal to the current command value in terms of vector. For this reason, even if the vector control is performed at high speed and with high accuracy, it is possible to prevent a false voltage operation and hence to perform the vector control stably.

As described above, the vector control can be performed with high accuracy by the use of the current sensed values of only one phase. However, as a result of research, the present inventors have found a problem such that when the rotation of the AC motor is close to stop, control performance will be impaired. The present inventors have found that this problem is caused from the following reason: the vector control is performed by the method for converging a control quantity (current estimated value or voltage command value) on one point on a two-dimensional plane by using the component of the current sensed value of one phase relatively rotating on the (d,q)-coordinate system by the rotation of the AC motor as described above. Hence, the present inventors have found that it is an important factor for keeping a high accuracy that various kinds of state quantities (rotation angle, phase, and phase current) are varied by the rotation of the AC motor.

Hence, the present inventors focused attention on the fact that a current sensor is disposed for the purpose of monitoring for any one phase other than one phase for controlling and performed the following control: that is, the AC motor is controlled on the basis of the current sensed values of two phases by using the current sensor for monitoring for the purpose of controlling limitedly to within a range in which the number of revolutions of the AC motor is low, that is, the control performance is impaired when the current estimation method described above is applied, thereby excluding causes affected by the number of revolutions of the AC motor and preventing the control performance from being impaired. Further, since a range in which the AC motor is controlled on the basis of the current sensed values of two phases is limited to the case where the number of revolutions of the AC motor is low, in the step where the number of revolutions of the AC motor reaches over the range, the current sensor for monitoring is returned for monitoring. In this way, a monitoring system can be kept and the AC motor can be driven in safety.

As described above, the present disclosure is not limited to the embodiments described above but can be put into practice in various modes within a range not departing from the gist of the present disclosure.

The above disclosure has the following aspects.

According to a first aspect of the present disclosure, a control device for controlling and driving a three-phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value and the rotation angle sensed value in such a manner that the one-phase current estimated value for controlling the alternate current motor is calculated by integrating a correction vector on a d-q axis plane, the correction vector being calculated based on a control phase current basic value and the control phase current sensed value, and the control phase current basic value being a component of the control phase of a previously calculated one-phase current estimated value; a voltage command value calculation means for calculating a voltage command value relating to a voltage to be impressed on the inverter based on the two-phase control current value, which is to be fed back, or the one-phase current estimated value for controlling the alternate current motor, which is to be fed back; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality; a number-of-revolutions calculation means for calculating the number of revolutions of the alternate current motor based on the rotation angle sensed value; and a number-of-revolutions determination means for determining whether the number of revolutions is not larger than a predetermined determination value. When the number of revolutions is not larger than the determination value, the switching means selects the two-phase control mode. When the number of revolutions is larger than the determination value, the switching means selects the one-phase control mode.

In the above control device, the current sensors are disposed for two phases of three phases. If it is determined that the number of revolutions is not larger than the determination value, a current feedback control is performed in the two-phase control mode at high speed and with high accuracy by the use of the two-phase control current values based on the two-phase current sensed values. On the other hand, if it is determined that the number of revolutions is larger than the determination value, the one-phase control mode is selected.

Here, the current sensor for controlling the drive of the AC motor (hereinafter referred to as "a current sensor for controlling") and the current sensor for detecting an abnormality of the current sensor (hereinafter referred to as "a current sensor for monitoring") need to be clearly differentiated from each other. This is because as follows: in a system (for example, a main motor of an electric vehicle) in which a current sensed value is fed back at high speed in such a way that the current sensed value is equal to a desired sine wave current, when all current sensed values sensed by the current sensor for controlling are precisely controlled so as to become a desired sine wave and the current sensed values of the current sensor for controlling are used for detecting an abnormality of the current sensor for controlling, there can be brought about a state in which an abnormality seems to be apparently not caused in the current sensor for controlling. This state is referred to as "the interference of current feedback". In order to prevent the interference of current feedback, when an abnormality of the current sensor is detected, the current sensor for monitoring needs to be completely independent of a current feedback loop. For this reason, the current sensor for controlling which is disposed for controlling the drive of the AC motor needs to be clearly differentiated from the current sensor for monitoring which is disposed for detecting an abnormality of the current sensor.

In the above control device, in the one-phase control mode, the monitor phase current sensed value is not used for the current feedback control but the current feedback control is performed by the use of the one-phase current estimated value for controlling, which hence makes it possible to prevent the current feedback control from interfering with the monitor phase current sensed value and to detect an abnormality of the current sensor. Further, in the present disclosure, an abnormality of the current sensor is detected on the basis of the comparison result of the current estimated value and the current sensed value. Here, one of the current sensed value and current estimated value which are compared with each other is the monitor phase current sensed value itself, which is not used for the current feedback control, or a current estimated value, which is based on the monitor phase current sensed value, and hence is not affected by the interference of the current feedback control, which hence makes it possible to suitably detect an abnormality of the current sensor.

In the above control device, the current estimation means calculates the one-phase current estimated value for controlling by integrating the correction vector on the (d,q) axis plane.

In this way, the correction vector is used as information changing with the rotation of the AC motor. In this way, the one-phase current estimated value for controlling is calculated by the use of the information changing with the rotation of the AC motor, so that it is possible to estimate two-dimensional quantities with high accuracy by adding a remaining one-dimensional component to the control phase current sensed value and hence to perform a two-dimensional vector control with high accuracy.

Here, when the number of revolutions of the AC motor is small, a change in the correction vector of the information changing with the rotation of the AC motor or a change in the deviation between the current command value and the one-phase control current estimated value is small, so that the controllability of the AC motor is likely to be impaired.

Hence, at the time of low rotation in which the estimation accuracy of the one-phase current estimated value for controlling is likely to become worse, the two-phase control current values of actual current values are calculated not by the use of the one-phase current estimated value for controlling but by the use of control phase current sensed value and the monitor phase current sensed value, and the AC motor is controlled on the basis of the voltage command values calculated on the basis of the two-phase control current values. In this way, it is possible to prevent the controllability of the AC motor from being impaired at the time of low rotation and to inhibit an abnormal torque from being generated by an abnormal current being passed through the AC motor and to inhibit various kinds of elements constructing the control device from generating heat and causing a failure. Further, in the case where the AC motor is used for the main motor of the hybrid vehicle or the electric automobile, it is possible to prevent drivability from being impaired by the generation of an abnormal torque and to prevent a sudden start from being caused by a user depressing an accelerator pedal more than required when a desired torque is not generated because of too small current passed through the AC motor and by torque being generated suddenly when the accuracy of current estimation is improved.

Alternatively, the other phase current estimation means may calculate the monitor phase current estimated value based on the one-phase current estimated value for controlling the alternate current motor. Further, the other phase current estimation means may: calculate a one-phase current estimated value for monitoring the alternate current motor based on the monitor phase current sensed value and the rotation angle sensed value in such a manner that the one-phase current estimated value for monitoring the alternate current motor is calculated by integrating a monitor phase correction vector on a d-q axis plane, the monitor phase correction vector being calculated based on a monitor phase current basic value and the monitor phase current sensed value, and the monitor phase current basic value being a component of the monitor phase of a previously calculated one-phase current estimated value for monitoring the alternate current motor; and calculate the control phase current estimated value based on the one-phase current estimated value for monitoring the alternate current motor.

According to a second aspect of the present disclosure, a control device for controlling and driving a three phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value, the rotation angle sensed value and a current command value relating to a driving of the alternate current motor; a voltage command value calculation means for calculating a voltage command value relating to a voltage to be impressed on the inverter based on the two-phase control current value, which is to be fed back, or the one-phase current estimated value for controlling the alternate current motor, which is to be fed back; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on he monitor phase current sensed value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality; a number-of-revolutions calculation means for calculating the number of revolutions of the alternate current motor based on the rotation angle sensed value; and a number-of-revolutions determination means for determining whether the number of revolutions is not larger than a predetermined determination value. When the number of revolutions is not larger than the determination value, the switching means selects the two-phase control mode. When the number of revolutions is larger than the determination value, the switching means selects the one-phase control mode.

In the above control device, the current sensors are disposed for two phases of three phases. If it is determined that the number of revolutions is not larger than the determination value, a current feedback control is performed in the two-phase control mode at high speed and with high accuracy by the use of the two-phase control current values based on the two-phase current sensed values. On the other hand, if it is determined that the number of revolutions is larger than the determination value, the one-phase control mode is selected.

In the above control device, in the one-phase control mode, the monitor phase current sensed value is not used for the current feedback control but the current feedback control is performed by the use of the one-phase current estimated value for controlling, which hence makes it possible to prevent the current feedback control from interfering with the monitor phase current sensed value and to detect an abnormality of the current sensor. Further, in the present disclosure, an abnormality of the current sensor is detected on the basis of the comparison result of the current estimated value and the current sensed value. Here, one of the current sensed value and current estimated value which are compared with each other is the monitor phase current sensed value itself, which is not used for the current feedback control, or a current estimated value, which is based on the monitor phase current sensed value, and hence is not affected by the interference of the current feedback control, which hence makes it possible to suitably detect an abnormality of the current sensor.

In the above control device, the current estimation means calculates the one-phase control current estimated value by the use of the current command value in addition to the control phase current sensed value and the rotation angle sensed value.

In this way, for example, the deviation between the current command value and the one-phase current estimated value for controlling can be used as information changing with the rotation of the AC motor. In this way, the one-phase current estimated value for controlling is calculated by the use of the information changing with the rotation of the AC motor, so that it is possible to estimate two-dimensional quantities with high accuracy by adding a remaining one-dimensional component to the control phase current sensed value and hence to perform a two-dimensional vector control with high accuracy.

Here, when the number of revolutions of the AC motor is small, a change in the correction vector of the information changing with the rotation of the AC motor or a change in the deviation between the current command value and the one-phase control current estimated value is small, so that the controllability of the AC motor is likely to be impaired.

Hence, at the time of low rotation in which the estimation accuracy of the one-phase current estimated value for controlling is likely to become worse, the two-phase control current values of actual current values are calculated not by the use of the one-phase current estimated value for controlling but by the use of control phase current sensed value and the monitor phase current sensed value, and the AC motor is controlled on the basis of the voltage command values calculated on the basis of the two-phase control current values. In this way, it is possible to prevent the controllability of the AC motor from being impaired at the time of low rotation and to inhibit an abnormal torque from being generated by an abnormal current being passed through the AC motor and to inhibit various kinds of elements constructing the control device from generating heat and causing a failure. Further, in the case where the AC motor is used for the main motor of the hybrid vehicle or the electric automobile, it is possible to prevent drivability from being impaired by the generation of an abnormal torque and to prevent a sudden start from being caused by a user depressing an accelerator pedal more than required when a desired torque is not generated because of too small current passed through the AC motor and by torque being generated suddenly when the accuracy of current estimation is improved.

Alternatively, the other phase current estimation means may calculate the monitor phase current estimated value based on the current command value in addition to the control phase current sensed value and the rotation angle sensed value. Further, the other phase current estimation means may calculate the control phase current estimated value based on the current command value in addition to the monitor phase current sensed value and the rotation angle sensed value.

Alternatively, in the one-phase control mode, the current calculation means stops calculating the two-phase control current value, and, in the two-phase control mode, the current estimation means stops calculating the one-phase current estimated value for controlling the alternate current motor, and the other phase current estimation means stops calculating the monitor phase current estimated value and the control phase current estimated value.

Alternatively, the control device may further include: a just-before switching determination means for determining whether the two-phase control mode is just before switching to the one-phase control mode. In the one-phase control mode, the current calculation means stops calculating the two-phase control current value. When the just-before switching determination means determines in the two-phase control mode that the two-phase control mode is not just before switching to the one-phase control mode, the current estimation means stops calculating the one-phase current estimated value for controlling the alternate current motor, and the other phase current estimation means stops calculating the monitor phase current estimated value and the control phase current estimated value. When the just-before switching determination means determines in the two-phase control mode that the two-phase control mode is just before switching to the one-phase control mode, the current estimation means calculates the one-phase current estimated value for controlling the alternate current motor, and the other phase current estimation means calculates the at least one of the monitor phase current estimated value and the control phase current estimated value.

Alternatively, the current calculation means may calculate the two-phase control current value in each of the one-phase control mode and the two-phase control mode. The current estimation means calculates the one-phase current estimated value for controlling the alternate current motor in each of the one-phase control mode and the two-phase control mode. The other phase current estimation means calculates the at least one of the monitor phase current estimated value and the control phase current estimated value in each of the one-phase control mode and the two-phase control mode.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling and driving a three-phase alternate current motor, which has an impressed voltage controlled by an inverter, the control device comprising:
   a control phase current acquisition means for acquiring a control phase current sensed value from a control phase current sensor, which is disposed on a control phase as one of three phases of the alternate current motor;
   a monitor phase current acquisition means for acquiring a monitor phase current sensed value from a monitor phase current sensor, which is disposed on a monitor phase as another one of the three phases different from the control phase;
   a rotation angle acquisition means for acquiring a rotation angle sensed value from a rotation angle sensor for sensing a rotation angle of the alternate current motor;
   a current calculation means for calculating a two-phase control current value based on the control phase current sensed value, the monitor phase current sensed value and the rotation angle sensed value;
   a current estimation means for calculating a one-phase current estimated value for controlling the alternate current motor based on the control phase current sensed value and the rotation angle sensed value in such a manner that the one-phase current estimated value for controlling the alternate current motor is calculated by integrating a correction vector on a d-q axis plane, the correction vector being calculated based on a control phase current basic value and the control phase current sensed value, and the control phase current basic value being a component of the control phase of a previously calculated one-phase current estimated value;
   a voltage command value calculation means for calculating a voltage command value relating to a voltage to be impressed on the inverter based on the two-phase control current value, which is to be fed back, or the one-phase current estimated value for controlling the alternate current motor, which is to be fed back;
   an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value;
   an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value;
   a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality;
   a number-of-revolutions calculation means for calculating the number of revolutions of the alternate current motor based on the rotation angle sensed value; and
   a number-of-revolutions determination means for determining whether the number of revolutions is not larger than a predetermined determination value,
   wherein, when the number of revolutions is not larger than the determination value, the switching means selects the two-phase control mode and
   wherein, when the number of revolutions is larger than the determination value, the switching means selects the one-phase control mode.

2. The control device according to claim 1,
   wherein the other phase current estimation means calculates the monitor phase current estimated value based on the one-phase current estimated value for controlling the alternate current motor.

3. The control device according to claim 1,
   wherein the other phase current estimation means: calculates a one-phase current estimated value for monitoring the alternate current motor based on the monitor phase current sensed value and the rotation angle sensed value in such a manner that the one-phase current estimated value for monitoring the alternate current motor is calculated by integrating a monitor phase correction vector on a d-q axis plane, the monitor phase correction vector being calculated based on a monitor phase current basic value and the monitor phase current sensed value, and the monitor phase current basic value being a component of the monitor phase of a previously calculated one-phase current estimated value for monitoring the alternate current motor; and calculates the control phase current estimated value based on the one-phase current estimated value for monitoring the alternate current motor.

4. A control device for controlling and driving a three phase alternate current motor, which has an impressed voltage controlled by an inverter, the control device comprising:
- a control phase current acquisition means for acquiring a control phase current sensed value from a control phase current sensor, which is disposed on a control phase as one of three phases of the alternate current motor;
- a monitor phase current acquisition means for acquiring a monitor phase current sensed value from a monitor phase current sensor, which is disposed on a monitor phase as another one of the three phases different from the control phase;
- a rotation angle acquisition means for acquiring a rotation angle sensed value from a rotation angle sensor for sensing a rotation angle of the alternate current motor;
- a current calculation means for calculating a two-phase control current value based on the control phase current sensed value, the monitor phase current sensed value and the rotation angle sensed value;
- a current estimation means for calculating a one-phase current estimated value for controlling the alternate current motor based on the control phase current sensed value, the rotation angle sensed value and a current command value relating to a driving of the alternate current motor;
- a voltage command value calculation means for calculating a voltage command value relating to a voltage to be impressed on the inverter based on the two-phase control current value, which is to be fed back, or the one-phase current estimated value for controlling the alternate current motor, which is to be fed back;
- an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current sensed value and the rotation angle sensed value;
- an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value;
- a switching means for switching between a two-phase control mode, in which the voltage command value is calculated based on the two-phase control current value, and a one-phase control mode, in which the voltage command value is calculated based on the one-phase current estimated value for controlling the alternate current motor, and the abnormality detection means detects the abnormality;
- a number-of-revolutions calculation means for calculating the number of revolutions of the alternate current motor based on the rotation angle sensed value; and
- a number-of-revolutions determination means for determining whether the number of revolutions is not larger than a predetermined determination value,
- wherein, when the number of revolutions is not larger than the determination value, the switching means selects the two-phase control mode, and
- wherein, when the number of revolutions is larger than the determination value, the switching means selects the one-phase control mode.

5. The control device according to claim 4,
wherein the other phase current estimation means calculates the monitor phase current estimated value based on the current command value in addition to the control phase current sensed value and the rotation angle sensed value.

6. The control device according to claim 4,
wherein the other phase current estimation means calculates the control phase current estimated value based on the current command value in addition to the monitor phase current sensed value and the rotation angle sensed value.

7. The control device according to claim 1,
wherein, in the one-phase control mode, the current calculation means stops calculating the two-phase control current value, and
wherein, in the two-phase control mode, the current estimation means stops calculating the one-phase current estimated value for controlling the alternate current motor, and the other phase current estimation means stops calculating the monitor phase current estimated value and the control phase current estimated value.

8. The control device according to claim 1, further comprising:
- a just-before switching determination means for determining whether the two-phase control mode is just before switching to the one-phase control mode,
- wherein, in the one-phase control mode, the current calculation means stops calculating the two-phase control current value,
- wherein, when the just-before switching determination means determines in the two-phase control mode that the two-phase control mode is not just before switching to the one-phase control mode, the current estimation means stops calculating the one-phase current estimated value for controlling the alternate current motor, and the other phase current estimation means stops calculating the monitor phase current estimated value and the control phase current estimated value, and
- wherein, when the just-before switching determination means determines in the two-phase control mode that the two-phase control mode is just before switching to the one-phase control mode, the current estimation means calculates the one-phase current estimated value for controlling the alternate current motor, and the other phase current estimation means calculates the at least one of the monitor phase current estimated value and the control phase current estimated value.

9. The control device according to claim 1,
wherein the current calculation means calculates the two-phase control current value in each of the one-phase control mode and the two-phase control mode, wherein the current estimation means calculates the one-phase current estimated value for controlling the alternate current motor in each of the one-phase control mode and the two-phase control mode, and wherein the other phase current estimation means calculates the at least one of the monitor phase current estimated value and the control phase current estimated value in each of the one-phase control mode and the two-phase control mode.

* * * * *